(12) United States Patent
Furuta et al.

(10) Patent No.: US 7,008,996 B2
(45) Date of Patent: Mar. 7, 2006

(54) WATER-DISPERSED POWDER SLURRY COATING

(75) Inventors: Takeshi Furuta, Otsu (JP); Yasuhiro Shindo, Kyoto (JP); Takafumi Horiie, Mukou (JP); Reiko Suwaki, Kusatu (JP); Yoshiko Kobayashi, Nishikamo-gun (JP)

(73) Assignees: Sanyo Chemical Industries, Ltd., Kyoto-Fu (JP); Toyota Jidosha Kabushiki Kaisha, Aichi-ken (JP)

( * ) Notice: Subject to any disclaimer, the term of this patent is extended or adjusted under 35 U.S.C. 154(b) by 312 days.

(21) Appl. No.: 10/395,442

(22) Filed: Mar. 24, 2003

(65) Prior Publication Data

US 2003/0220444 A1 Nov. 27, 2003

(30) Foreign Application Priority Data

| Mar. 25, 2002 | (JP) | ................................ 2002-84589 |
| Mar. 4, 2003 | (JP) | ................................ 2003-57488 |
| Mar. 4, 2003 | (JP) | ................................ 2003-57512 |
| Mar. 4, 2003 | (JP) | ............................. 2003-057517 |
| Mar. 4, 2003 | (JP) | ............................. 2003-057522 |

(51) Int. Cl.
*C08J 3/00* (2006.01)
*C08K 3/20* (2006.01)
*C08L 75/00* (2006.01)
*B05D 3/02* (2006.01)
*B32B 27/00* (2006.01)

(52) U.S. Cl. ................ 524/591; 427/372.2; 427/385.5; 428/423.1; 523/402; 523/406; 524/500; 524/501; 524/589; 524/590; 524/507; 524/839; 524/840

(58) Field of Classification Search ................ 524/507, 524/591, 839, 840, 501, 500, 589, 590; 523/402, 523/406; 427/372.2, 385.5; 428/423.1
See application file for complete search history.

(56) References Cited

U.S. PATENT DOCUMENTS

| 5,379,947 A | 1/1995 | Williams et al. ............... 241/21 |
| 2002/0151651 A1 * | 10/2002 | Taylor et al. ................ 525/123 |

FOREIGN PATENT DOCUMENTS

| JP | 63-091130 | 4/1988 |
| JP | 63-286473 | 11/1988 |
| JP | 07-196953 | 8/1995 |
| JP | 09-078001 | 3/1997 |
| JP | 09-272705 | 10/1997 |
| JP | 2000-515572 | 11/2000 |
| JP | 2001-220544 | 8/2001 |
| WO | 98/03575 | 1/1998 |

* cited by examiner

*Primary Examiner*—Patrick D. Niland
(74) *Attorney, Agent, or Firm*—Jun Umemuro; John B. Alexander; Edwards Angell Palmer & Dodge LLP

(57) ABSTRACT

A water-dispersed powder slurry coating comprises: (A) a particulate comprising (a1) a resin having an active hydrogen; (B) a reactive surfactant having an optionally blocked isocyanate group and/or an epoxy group; and an aqueous medium in which the particulate and the reactive surfactant are contained. The powder slurry coating can provide a film excellent in water resistance and strength. The powder slurry coating can be baked at a lower temperature and provide a film excellent in resistance to acid rain.

18 Claims, No Drawings

WATER-DISPERSED POWDER SLURRY COATING

BACKGROUND OF THE INVENTION

1. Field of the Invention

The present invention relates to a powder slurry coating composition and specifically to a powder slurry coating composition that is excellent in dispersibility of resin in water and can provide a cured film with excellent strength after baking.

2. Description of the Related Art

Powder slurry coatings to be applied are in the form of a dispersion of fine resin particles in water. In such coatings, various additives such as surfactants, thickeners and the like are used to prevent the fine resin particles from gathering or precipitating and to have them stably dispersed in the water (for example, see Japanese Patent Laid-Open No. 2001-220544 and Japanese Patent Laid-Open No. 7-196953 (1995), pp. 3–4.)

In such powder slurry coatings, the base component and the curing agent should be prevented from reacting with each other during the storage. Therefore, the functional group of the curing agent is blocked for use (for example, see Japanese Patent Laid-Open No. 7-196953 (1995), pp. 3–4.)

When the powder slurry coatings with surfactants are practically used, however, the surfactants remaining after the evaporation of the water medium to dryness can worsen the water resistance of the film. The surfactants can also develop a plasticizing effect to worsen the strength of the film.

In addition, the powder slurry coatings with the curing agent having a blocked functional group need a high baking temperature in practical use, because the blocking agent generally needs a very high temperature of 160° C. or higher to entirely react after dissociation. Such a high baking temperature can reduce the productivity because of more time for heating or cooling after the curing and also can cause discoloration of the film after baking. The heat source required for such a high temperature is also undesirable in terms of environment.

If the film formed by applying and baking the slurry coating is exposed to the outdoor environment, it needs acid rain resistance. However, the additives such as surfactants and thickeners remaining in the film formed from the conventional slurry coatings can coagulate as the acid rain vaporizes and therefore worsen the appearance and quality of the film.

SUMMARY OF THE INVENTION

It is an object of the present invention to solve the above-described problems and to provide a powder slurry coating that can provide a film excellent in water resistance and strength, a powder slurry coating that can be baked at a lower temperature, and a powder slurry coating that can provide excellent resistance to acid rain.

The inventors have made active investigations to solve the problems and completed the present invention. Thus, the present invention is directed to a water-dispersed powder slurry coating, comprising: (A) a particulate comprising (a1) a resin having an active hydrogen; (B) a reactive surfactant having at least one of an optionally blocked isocyanate group and an epoxy group; and (M) an aqueous medium in which the particulate and the reactive surfactant are contained.

The present invention is also directed to a film formed by applying and baking the above water-dispersed powder slurry coating.

The present invention is described in detail in the following.

DETAILED DESCRIPTION OF THE PREFERRED EMBODIMENTS

In the present invention, the reactive surfactant (B) preferably comprises a hydrophobic moiety and a hydrophilic moiety and preferably has at least one of the optionally blocked isocyanate group and the epoxy group in the hydrophobic moiety. The hydrophobic moiety preferably has an aromatic ring-containing hydrocarbon group having 6 to 100 carbon atoms and at least one of the optionally blocked isocyanate group and the epoxy group. The hydrophilic moiety is preferably one member selected from the group consisting of an oxyethylene unit, an anion group, a cation group, and an amphoteric ion group.

Concerning the present invention, hereinafter, the reactive surfactant (B) having an oxyethylene unit in the hydrophilic moiety is referred to as a reactive surfactant (B1); the reactive surfactant (B) having one member selected from the group consisting of an anion group, a cation group, and an amphoteric ion group in the hydrophilic moiety is referred to as a reactive surfactant (B2); and the reactive surfactant (B1) having one member selected from the group consisting of an anion group, a cation group, and an amphoteric ion group is referred to as a reactive surfactant (B3).

In terms of water resistance of the film formed from the aqueous dispersion using the reactive surfactant (B), the number of at least one of the optionally blocked isocyanate group and the epoxy group per one molecule of the reactive surfactant (B) is preferably 1 to 20, more preferably 1 to 15, particularly preferably 1 to 10, most preferably 1 to 5.

The hydrophilic moiety of the reactive surfactant (B) preferably comprises one or more hydrophilic groups of an oxyethylene unit such as polyoxyethylene moiety; an anion group; a cation group; and an amphoteric ion group.

In the case that the hydrophilic group is the oxyethylene unit, the content of the oxyethylene unit based on the weight of the reactive surfactant (B) is preferably 20% by weight or more, more preferably 30% by weight or more, particularly preferably 50% by weight or more; preferably 90% by weight or less, more preferably 85% by weight or less, particularly preferably 80% by weight or less. An oxyethylene content from 20% to 90% by weight can provide a slurry coating that is strong in emulsifying power and stable.

In the present invention, the reactive surfactant (B) has one or more hydrophobic moieties. Examples of the hydrophobic moiety include an aromatic ring-containing hydrocarbon group having 6 to 100 or more, preferably 8 to 80 carbon atoms and having at least one of the optionally blocked isocyanate group and the epoxy group in the molecular structure. Examples of the aromatic ring-containing hydrocarbon group include styrenated phenyl groups; hydroxyl group-free residues of bisphenols such as bisphenol A, bisphenol S, and bisphenol F; and vinyl monomer adducts thereof.

The hydrophobic moiety may also be a hydrophobic oxyalkylene unit such as an oxypropylene unit and an oxytetramethylene unit.

Any process can be used without limit to introduce the optionally blocked isocyanate group or the epoxy group, or both, into the hydrophobic moiety, for example, including the addition polymerization of at least one of (b2) an optionally blocked isocyanate monomer having a double bond and (b2') a vinyl monomer having an epoxy group with any other unsaturated monomer.

Examples of the isocyanate compound having the double bond include isocyanate ethyl (meth)acrylate, isocyanate propyl (meth)acrylate, isocyanate butyl (meth)acrylate, isocyanate hexyl (meth)acrylate, 3-isopropenyl-α,α-dimethylbenzylisocyanate, 3-ethylenyl-α,α-dimethylbenzylisocyanate, and any combination of two or more thereof.

Preferred examples include 3-isopropenyl-α,α-dimethylbenzylisocyanate and 3-ethylenyl-α,α-dimethylbenzylisocyanate.

Examples of the blocking agent for the isocyanate group include lactams such as ε-caprolactam, δ-valerolactam, and γ-butyrolactam; phenols such as phenol, cresol, ethylphenol, butylphenol, nonylphenol, and dinonylphenol; oximes such as methyl ethyl ketone oxime, acetophenone oxime, and benzophenone oxime; alcohols such as methanol, ethanol, butanol, and cyclohexanol; diketones such as dimethyl malonate, diethyl malonate, methyl acetoacetate, ethyl acetoacetate, and acetylacetone; mercaptans such as butyl mercaptan and dodecyl mercaptan; uretdiones such as isophorone diisocyanate dimer and hexamethylene diisocyanate dimer; amides such as acetamide and acetic amide; imides such as succinic imide and maleic imide; sulfites such as sodium bisulfite; and any combination of two or more thereof.

Preferred examples include alcohols, lactams, oximes, and phenols, and methanol, ethanol, and methyl ethyl ketone oxime are particularly preferred.

The vinyl monomer (b2') having the epoxy group may be any known compound that has the epoxy group and a polymerizable vinyl group in the molecular structure. Examples of the vinyl monomer (b2') include glycidyl esters of unsaturated carboxylic acids such as glycidyl (meth) acrylate, glycidyl α-ethylacrylate, glycidyl α-n-propylacrylate, glycidyl α-n-butylacrylate, (meth)acrylate-3,4-epoxybutyl, (meth)acrylate-4,5-epoxypentyl, (meth)acrylate-6,7-epoxyheptyl, α-ethylacrylate-6,7-epoxyheptyl, methyl glycidyl (meth)acrylate; and unsaturated glycidyl ethers such as styrene-p-glycidyl ether, 2,3-diglycidyloxystyrene, 4-vinyl-1-cyclohexene-1,2-epoxide, 3,4-diglycidyloxystyrene, 2,4-diglycidyloxystyrene, 3,5-diglycidyloxystyrene, 2,6-diglycidyloxystyrene, 2,3-dihydroxymethylstyrene diglycidyl ether, 3,4-dihydroxymethylstyrene diglycidyl ether, 2,4-dihydroxymethylstyrene diglycidyl ether, 3,5-dihydroxymethylstyrene diglycidyl ether, 2,6-dihydroxymethylstyrene diglycidyl ether, 2,3,4-trihydroxymethylstyrene triglycidyl ether, 1,3,5-trihydroxymethylstyrene triglycidyl ether, 5-vinylpyrogallol triglycidyl ether, 4-vinylpyrogallol triglycidyl ether, and vinylfluoroglycinol triglycidyl ether.

Useful examples of the other unsaturated monomer include but are not limited to an aliphatic vinyl hydrocarbon, an alicyclic vinyl hydrocarbon, and an aromatic vinyl hydrocarbon.

Examples of the aliphatic vinyl hydrocarbon include ethylene, propylene, butene, isobutylene, pentene, heptene, diisobutylene, octene, dodecene, octadecene, butadiene, isoprene, 1,4-pentadiene, 1,6-hexadiene, 1,7-octadiene, and other α-olefins. Examples of the alicyclic vinyl hydrocarbon include cyclohexene, (di)cyclopentadiene, pinene, limonene, indene, vinylcyclohexene, and ethylidene bicycloheptene. Examples of the aromatic vinyl hydrocarbon include styrene, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, vinylnaphthalene, divinylbenzene, divinyltoluene, divinylxylene, divinylketone, and trivinylbenzene.

In the present invention, for example, the nonionic reactive surfactant (B1) preferably comprises (L) a urethane resin having at least one of the optionally blocked isocyanate group and the epoxy group. The urethane resin (L) comprises: (b3) an addition reaction product of (b1) a monohydric phenol or a monohydric aromatic alcohol and at least one of (b2) a vinyl monomer having an optionally blocked isocyanate group and (b2') a vinyl monomer having an epoxy group, or an alkylene oxide adduct of the addition reaction product; (b4) an organic diisocyanate; and (b5) at least one of a diol and a diamine each having a polyoxyalkylene chain including a polyoxyethylene moiety, as main components, and may optionally use (b10) a chain-lengthening agent or (b11) a chain-terminating agent, or both.

The weight average molecular weight of the nonionic reactive surfactant (B1) is preferably 1,000 to 150,000, more preferably 5,000 to 100,000, particularly preferably 10,000 to 25,000. A weight average molecular weight of 1,000 or more is preferred, because a sufficient surface activity can be provided. A weight average molecular weight of 150,000 or less is preferred, because the resulting aqueous resin dispersion can be low in viscosity and stable. The weight average molecular weight can be measured by gel permeation chromatography (GPC). In this technique, the column loaded with polystyrene gel is run with the polymer solution, and the concentration and the molecular weight of the polymer in the elute are determined as the function of the amount of the elution.

In the addition reaction of the monohydric phenol or the monohydric aromatic alcohol (b1), at least one of the vinyl monomer (b2) and the vinyl monomer (b2') may be used in combination with (b9) a vinyl monomer with neither isocyanate group nor epoxy group as needed.

Any monohydric phenol or any monohydric aromatic alcohol (b1) can be used without limit to form the nonionic reactive surfactant (B1), for example, including phenol, alkyl (C1 to C18) phenol such as nonyl phenol, dodecyl phenol, and octyl phenol; arylalkylated phenol such as cumyl phenol; alkyl (C1 to C18) ethers of bisphenols such as monomethyl ether of bisphenol A, monobutyl ether of bisphenol A, and monobutyl ether of bisphenol S; and any combination of two or more thereof.

Preferred examples include phenol and cumyl phenol.

Examples of the monohydric aromatic alcohol include benzyl alcohol, 2-biphenylethanol, and 4-biphenylethanol.

Preferred examples include benzyl alcohol.

Examples of the vinyl monomer (b2) include the above isocyanate compounds having the double bond.

Preferred examples of such a vinyl monomer include 3-isopropenyl-α,α-dimethylbenzylisocyanate and 3-ethylenyl-α,α-dimethylbenzylisocyanate.

The vinyl monomer (b2') may be any known compound that has an epoxy group and a polymerizable vinyl group in the molecular structure, for example, including the above vinyl monomers having the epoxy group.

Preferred examples of the vinyl monomer (b2') include styrene-p-glycidylether and 2,3-diglycidyloxystyrene.

Examples of the optionally used vinyl monomer with neither isocyanate group nor epoxy group (b9) include but are not limited to the above unsaturated monomers.

Preferred examples of the monomer (b9) include styrene.

The addition reaction product or its alkylene oxide adduct (b3) can be formed by any process of adding the monohydric phenol or the monohydric aromatic alcohol (b11) to the vinyl monomer (b2) or the vinyl monomer (b2') and optionally the vinyl monomer (b9). Such a process preferably includes but is not limited to a Friedel-Crafts reaction.

Any known Friedel-Crafts reaction process can be used, for example, including polyaddition of the monohydric phenol or the monohydric aromatic alcohol (b1) to at least one of the vinyl monomer (b2) having the optionally blocked isocyanate group and the vinyl monomer (b2') having the epoxy group and optionally the vinyl monomer (b9) by the use of any known Lewis acid catalyst such as iron chloride and aluminum chloride.

In the present invention, the addition reaction product formed by adding the monohydric phenol or the monohydric aromatic alcohol (b1) to at least one of the vinyl monomer (b2) and the vinyl monomer (b2') and optionally the vinyl monomer (b9) may further be subjected to the addition of an alkylene oxide to form the alkylene oxide adduct (b3).

Any alkylene oxide (hereinafter abbreviated as "AO", having 1 to 30 carbon atoms) can be used without limit, for example, including ethylene oxide (hereinafter abbreviated as "EO"), propylene oxide (hereinafter abbreviated as "PO"), 1,2-, 1,3-, or 2,3-butylene oxide, tetrahydrofuran, α-olefin (C4 to C30) oxide, epichlorohydrin, styrene oxide, and any combination of two or more thereof. Preferred examples include EO. The mode of the addition is preferably random addition or block addition, or both.

The added alkylene oxide may be 1 to 30 moles, preferably 1 to 10 moles, more preferably 1 to 5 moles.

In the addition reaction product or the alkylene oxide adduct thereof (b3), the weight ratio of the constituent units: the monohydric phenol or the monohydric aromatic alcohol (b1)/at least one of the vinyl monomer (b2) and the vinyl monomer (b2')/the optional vinyl monomer (b9)/the added AO is preferably (1 to 5)/(1 to 20)/(0 to 20)/(0 to 50), more preferably (1 to 3)/(1 to 10)/(1 to 10)/(1 to 25).

Examples the organic diisocyanate (b4) include but are not limited to:

(1) aliphatic diisocyanates having 2 to 18 carbon atoms (wherein the carbon atom in the NCO group is not counted (hereinafter in the same manner)) such as ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl)carbonate, and 2-isocyanatoethyl-2,6-diisocyanatohexanoate;

(2) alicyclic diisocyanates having 4 to 15 carbon atoms such as isophorone diisocyanate (IPDI), dicyclohexylmethane-4,4'-diisocyanate (hydrogenated MDI), cyclohexylene diisocyanate, methylcyclohexylene diisocyanate (hydrogenated TDI), and bis(2-isocyanatoethyl)-4-cyclohexene;

(3) aromatic diisocyanates having 6 to 14 carbon atoms such as 1,3- or 1,4-phenylene diisocyanate, 2,4- or 2,6-tolylene diisocyanate (TDI), crude TDI, 2,4'- or 4,4'-diphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, crude MDI, and 1,5-naphthylene diisocyanate;

(4) aromatic aliphatic diisocyanates having 8 to 15 carbon atoms such as m- or p-xylylene diisocyanate (XDI) and α,α,α',α'-tetramethylxylylene diisocyanate (TMXDI);

(5) Modifications of these diisocyanates such as those having a carbodiimide group, a uretdione group, a uretimine group, or a urea group; and (6) any combination of two or more of thereof ((1) to (5)). Preferred examples include HDI, TDI, and IPDI.

In terms of emulsifying power of the above (B), the content of the polyoxyethylene moiety in at least one of the diol and the diamine (b5) having the polyoxyalkylene chain is preferably 20 to 100% by weight, more preferably 50 to 100% by weight, particularly preferably 70 to 100% by weight based on the weight of at least one of the diol and the diamine (b5).

Examples of the diol and the diamine (b5) include (b5-1) a hydroxyl group-terminated polyether diol, (b5-2) a hydroxyl group-terminated polyester diol, and (b5-3) an amino group-terminated polyether diamine. The diol alone, the diamine alone, or both of the diol and the diamine may be used.

As the polyether diol (b5-1), for example, a low molecular weight diol, a compound having the structure of an AO-added dihydric phenol, or a combination thereof may be used.

Examples of the low molecular weight diol include but are not limited to ethylene glycol (hereinafter abbreviated as "EG"); diethylene glycol; propylene glycol; dipropylene glycol; 1,4-butanediol (hereinafter abbreviated as "14BG"); 1,3-butanediol; neopentyl glycol; 1,6-hexanediol; low molecular weight diols having a cyclic group such as those disclosed in Japanese Patent Publication No. 45-1474 (1970); bis(hydroxymethyl)cyclohexane; bis(hydroxyethyl) benzene; and ethylene oxide adducts of bisphenol A; and any combination of two or more thereof.

Useful examples of the dihydric phenol to which the AO should be added include but are not limited to a dihydric phenol having 6 to 30 carbon atoms. Examples of the dihydric phenol include monocyclic dihydric phenols such as catechol, resorcinol, and hydroquinone; dihydric condensed ring compounds such as dihydroxynaphthalene; bisphenols such as bisphenol A, bisphenol F, bisphenol S, dihydroxydiphenyl ether, and dihydroxydiphenyl thioether; binaphthol; and alkyl (C1 to C10) or halogen (such as chlorine and bromine) substituted compounds thereof such as brominated bisphenol A.

Examples of the polyester diol (b5-2) include condensed polyester diols that are formed by the reaction of the polyether diol (b5-1) having a number average molecular weight of 1,000 or less with a dicarboxylic acid or a low molecular weight diol, or both, and have the polyoxyethylene moiety in the above-described manner.

Examples of the low molecular weight diol include those described above.

Examples of the dicarboxylic acid include aliphatic dicarboxylic acids such as succinic acid, adipic acid, azelaic acid, and sebacic acid; aromatic dicarboxylic acids such as terephthalic acid, isophthalic acid, and phthalic acid; ester formable derivatives of these dicarboxylic acids such as acid anhydrides and lower alkyl (C1 to C4) esters; and any combination of two or more thereof.

As the polyether diamine (b5-3), the product obtained by the modification of the polyether diol (b5-1) in which the terminal hydroxyl group is modified into an amino group may be used.

Any known method can be used to modify the terminal hydroxyl group into the amino group. In a specific method, the terminal hydroxyl group of the polyether diol (b5-1) is converted into a terminal cyanoalkyl group, which is reduced to an aminoalkyl group. In a more specific method, the polyether diol (b5-1) having the terminal hydroxyl group is allowed to react with acrylonitrile or nonenenitrile, and the formed cyanoethyl compound is hydrogenated.

A preferred method includes the steps of converting the terminal hydroxyl group into a cyanoalkyl group in the polyether diol (b5-1) and reducing the terminal cyanoalkyl group to an aminoalkyl group.

The number average molecular weight of the diol and the diamine (b5) per one hydroxyl or one amino group is preferably 100 to 10,000 or more, more preferably 400 to 4,000.

Examples of the chain-lengthening agent (b10) optionally used include water; the above low molecular weight diols; diamines such as aliphatic diamines having 2 to 6 carbon atoms such as ethylene diamine and 1,2-propylene diamine; alicyclic diamines having 6 to 15 carbon atoms such as isophorone diamine and 4,4'-diaminodicyclohexylmethane; and aromatic diamines having 6 to 15 carbon atoms such as 4,4'-diaminodiphenylmethane; monoalkanolamines such as monoethanolamine; hydrazine or its derivatives such as dihydrazide adipate; and any combination of two or more thereof The low molecular weight diols are preferred, and EG and 14BG are particularly preferred.

Examples of the chain-terminating agent (b11) include but are not limited to (b11-1) a monohydric aliphatic alcohol and (b11-2) an aliphatic monoamine.

Examples of the monohydric aliphatic alcohol (b11-1) include saturated aliphatic monohydric alcohols having 1 to 18 carbon atoms such as ethyl alcohol, propyl alcohol, butyl alcohol, octyl alcohol, lauryl alcohol, 2-octylalcohol, and 2-ethylhexylalcohol; and unsaturated aliphatic monohydric alcohols having 1 to 18 carbon atoms such as oleyl alcohol.

Examples of the aliphatic monoamine (b11-2) include aliphatic monoamines having 1 to 18 carbon atoms such as octyl amine, 2-ethylhexylamine, dodecyl amine, dibutyl amine, dioctyl amine, and di(2-ethylhexyl)amine; unsaturated aliphatic monoamines having 1 to 18 carbon atoms such as oleyl amine; and hydroxyalkyl group-containing monoamines having 1 to 16 carbon atoms such as monoethanolamine and diethanolamine.

The monohydric aliphatic alcohols and the aliphatic monoamines are preferred, and the monohydric aliphatic alcohols are particularly preferred.

In the present invention, the urethane resin (L) is preferably the compound represented by the general formula (1):

(1)

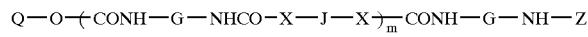
$$Q-O-(CONH-G-NHCO-X-J-X)_m-CONH-G-NH-Z$$

wherein Q represents a residue of (b3) an addition reaction product of (b1) a monohydric phenol or a monohydric aromatic alcohol and at least one of (b2) a vinyl monomer having an optionally blocked isocyanate group and (b2') a vinyl monomer having an epoxy group, or an alkylene oxide adduct of the addition reaction product, G represents a residue of (b4) an organic diisocyanate optionally having a urea bond, X represents O or NH, J represents a residue of (b5) at least one of a diol and a diamine each having a polyoxyalkylene chain that includes a polyoxyethylene moiety, Z represents hydrogen or the group represented by —COO—Q or —CO—Y, wherein Y is —OR$^1$, wherein R$^1$ is a monohydric alcohol residue having 1 to 18 carbon atoms, or—NR$^2$R$^3$, wherein R$^2$ is a hydrocarbon group having 1 to 18 carbon atoms or a hydroxyalkyl group having 1 to 16 carbon atoms, and R$^3$ is hydrogen, a hydrocarbon group having 1 to 18 carbon atoms, or a hydroxyalkyl group having 1 to 16 carbon atoms, and m is an integer of 1 to 500.

In the present invention, the urethane resin (L) can be prepared by any process without limit. According to a conventional process for synthesizing polyurethane resins (such as one-shot process or multi-stage process), the addition reaction product or its alkylene oxide adduct (b3) is allowed to react with the organic diisocyanate (b4) and at least one of the diol and the amine (b5), and optionally the chain-lengthening agent (b10) and the chain-terminating agent (b11) to form the urethane resin (L). The reaction temperature for forming the urethane is preferably 30 to 200° C., more preferably 50 to 180° C. The reaction time is preferably 0.1 to 30 hours, more preferably 0.1 to 8 hours.

The urethane forming reaction is preferably carried out in a solvent-free system or in an organic solvent inactive to the isocyanate. Examples of such an organic solvent include acetone, tetrahydrofuran, dimethylformamide, dimethyl sulfoxide, toluene, and dioxane. After the generation of the urethane resin (L), the organic solvent is preferably removed by evaporation.

In the urethane forming reaction, the equivalent ratio of the hydroxyl group (OH) and the amino group (NH$_2$) to the isocyanate group (NCO) of the organic diisocyanate (b4) [(OH+NH$_2$):NCO] is preferably 1:(0.8 to 1.5), more preferably 1:(0.9 to 1.3). If the equivalent ratio of the NCO group is from 0.8 to 1.5, the resulting polyurethane resin can have a moderate molecular weight, and the resulting aqueous resin dispersion can provide a film having good water resistance.

In the present invention, the reactive surfactant (B2) having an anion, cation, or amphoteric ion moiety can comprise any hydrophilic group without limit. Examples of such a hydrophilic group include but are not limited to anion groups such as a carboxylate group (—COO$^-$X$^+$), a sulfonate group (—SO$_3^-$X$^+$), a sulfate ester salt group (—OSO$_3^-$X$^+$), a phosphate ester salt group (—OPO$_3$H$^-$X$^+$ or —OPO$_3^{2-}$.2X$^+$), wherein X may be sodium, potassium, ammonium, alkanolamine salt, or the like; cation groups such as a primary amine salt group, a secondary amine salt group, a tertiary amine salt group, and a quaternary ammonium salt group; and amphoteric ion groups such as a betaine group.

The content of the hydrophilic group based on the weight of the reactive surfactant (B2) is preferably 0.1% by weight or more, more preferably 1% by weight or more, particularly preferably 5% by weight or more; preferably 50% by weight or less, more preferably 20% by weight or less, particularly preferably 10% by weight or less. If the content of the hydrophilic group is from 0.1% to 50% by weight, the resulting slurry coating can be strong in emulsifying power and stable.

The reactive surfactant (B2) preferably has a weight average molecular weight of 300 to 100,000, more preferably 800 to 50,000, particularly preferably 1,000 to 8,000. A weight average molecular weight of 300 or more is preferred, because sufficient surface activity can be obtained. A weight average molecular weight of 100,000 or less is preferred, because the resulting aqueous resin dispersion can be low in viscosity and stable.

In the present invention, for example, the reactive surfactant (B2) preferably comprises: (b3') a residue of the addition reaction product of (b1) the monohydric phenol or the monohydric aromatic alcohol and at least one of (b2) the vinyl monomer having the optionally blocked isocyanate group and (b2') the vinyl monomer having the epoxy group, or a residue of the alkylene oxide adduct of the addition reaction product; and at least one ion group selected from the group consisting of an anion group, a cation group, and an amphoteric ion group, as main constituents.

At least one ion group selected from the group consisting of the anion group, the cation group, and the amphoteric ion group may be added to any site of the residue (b3'). For example, such an ion group can be added to the aromatic ring, the hydroxyl group derived from the monohydric phenol or the monohydric aromatic alcohol (b1), or the hydroxyl group formed by the addition of the alkylene oxide to the above hydroxyl group.

In the present invention, any process can be used without limit to prepare the reactive surfactant (B2). For example, the addition reaction product or the alkylene oxide adduct thereof (b3) can be anionized (B2-1), cationized (B2-2), or amphoteric-ionized (B2-3) at its terminal hydroxyl group to form the reactive surfactant (B2).

In an example of the method for producing the anionized reactive surfactant (B2-1), the terminal hydroxyl group of the addition reaction product or the alkylene oxide adduct thereof (b3) is allowed to react with sulfuric acid anhydride, chlorosulfonic acid, or the like to form a sulfate ester, or react with phosphoric acid anhydride or the like to form a phosphate ester. The reaction temperature is preferably 20° C. to 200° C., more preferably 20° C. to 100° C. The reaction time is preferably 0.1 to 30 hours, more preferably 0.1 to 10 hours.

In an example of the method for producing the cationized reactive surfactant (B2-2), the aminated terminal end of the addition reaction product or the alkylene oxide adduct thereof (b3) is neutralized with acid or quaternarized with an alkylating agent. Any acid can be used without limit for the neutralization, for example, including hydrochloric acid and acetic acid. Examples of the alkylating agent for the quaternarization include methyl chloride, methyl bromide, benzyl chloride, long-chain alkyl chloride, epichlorohydrin, dimethyl sulfate, and ethylene oxide. In an example of the process for aminating the terminal end, acrylonitrile is added dropwise to the addition reaction product or the alkylene oxide adduct thereof (b3) in the presence of an alkali catalyst such as potassium hydroxide at a temperature of 10 to 80° C. so that the acrylonitrile is added to the hydroxyl group of the reactant, and then after the removal of the alkali catalyst, the acrylonitrile-added product is hydrogenated in a solvent such as methanol with a catalyst such as nickel or cobalt under a high pressure such as a pressure of 30 to 100 kg/cm$^2$.

The reaction temperature for the neutralization is preferably 20 to 150° C., more preferably 20 to 100° C., and the reaction time is preferably 0.1 to 20 hours, more preferably 0.1 to 6 hours.

The reaction temperature with the alkylating agent is preferably 50 to 300° C., more preferably 80 to 150° C., and the reaction time is preferably 0.1 to 20 hours, more preferably 0.1 to 12 hours.

Examples of the method for producing the amphoteric-ionized reactive surfactant (B2-3) include a method in which the terminal amino group of the addition reaction product or the alkylene oxide adduct thereof (b3) is tertiarized with the alkylating agent and then allowed to react with an aqueous solution of sodium monochloroacetate; and a method in which the addition reaction of a vinyl group-containing ester or a vinyl group-containing nitrile is followed by saponification with alkali. Examples of the vinyl group-containing ester include methyl acrylate and acrylonitrile.

In the present invention, the OH-terminated nonionic reactive surfactant (B1) may be allowed to react and converted into the reactive surfactant (B3) having at least one member selected from the group consisting of the anion group, the cation group, and the amphoteric ion group. Such a process can be carried out according to the process of the reactive surfactant (B2).

In the present invention, the content of the anion group, the cation group, or the amphoteric ion group in the reactive surfactant (B3) is preferably 0.1% by weight or more, more preferably 1% by weight or more, particularly preferably 5% by weight or more; preferably 50% by weight or less, more preferably 20% by weight or less, particularly preferably 10% by weight or less based on the weight of the reactive surfactant (B3). If the content of the hydrophilic group is from 0.1% by weight to 50% by weight, the resulting slurry coating can be strong in emulsifying power and stable.

The reactive surfactant (B3) preferably has a weight average molecular weight of 1,000 to 100,000, more preferably 2,000 to 50,000, particularly preferably 4,000 to 20,000. A weight average molecular weight of 1,000 or more is preferred, because sufficient surface activity can be obtained. A weight average molecular weight of 100,000 or less is preferred, because the resulting aqueous resin dispersion can be low in viscosity and stable.

In the present invention, if the curing agent (a2) has a blocked isocyanate group, a nonreactive surfactant (B') can be used in combination. The reactive surfactant (B) may partially be replaced with the nonreactive surfactant (B'). In the combination of the reactive surfactant (B) and the nonreactive surfactant (B'), the amount ratio (B'/B) of the nonreactive surfactant (B') to the reactive surfactant (B) is preferably not less than 0/1 and 0.8/1 or less, more preferably not less than 0.1/1 and 0.6/1 or less, in terms of water resistance.

Examples of the nonreactive surfactant (B') include known surfactants such as nonionic surfactants (B'(1)), anionic surfactants (B'(2)), cationic surfactants (B'(3)), and amphoteric surfactants (B'(4)).

Examples of the nonionic surfactant (B'(1)) include alkylene oxide added type nonionic surfactants (B'(1)1) and polyhydric alcohol type nonionic surfactants (B'(1)2).

Examples of the anionic surfactant (B'(2)) include carboxylic acids or salts thereof (B'(2)1), sulfate ester salts (B'(2)2), salts of carboxymethyl compounds (B'(2)3), sulfonate salts (B'(2)4), and phosphate ester salts (B'(2)5).

Examples of the cationic surfactant (B'(3)) include quaternary ammonium salt types and amine salt types.

Example of the amphoteric surfactant (B'(4)) for use in the present invention include (1) carboxylate salt type amphoteric surfactants, (2) sulfate ester salt type amphoteric surfactants, (3) sulfonate salt type amphoteric surfactants, and (4) phosphate ester salt type amphoteric surfactants.

In the present invention, HLB of the reactive surfactant (B) or the nonreactive surfactant (B') is preferably 5 to 40, more preferably 5 to 20, in terms of the power of emulsifying the ethylenic unsaturated monomer and the process of dispersing the resin particulate to form a stable aqueous dispersion or emulsion. The HLB can be adjusted by modulating the type and the content of the hydrophobic group or the hydrophilic group. For example, the HLB can be determined according to the Oda's method described in Takehiko Fujimoto, "Shin Kaimenkasseizai Nyumon" (in Japanese) (New Introduction of Surfactants), Completely Revised Version, Sanyo Chemical Industries, Ltd., 1992, p. 197. In this method, an organic (hydrophobic) value and an inorganic (hydrophilic) value are obtained from the type and the content of the hydrophobic and hydrophilic groups in the above (B) using the reference organic value and the reference inorganic value each estimated on each functional group from the number of carbon atom(s) (for example, these values are shown in Table 3.3.11 of the above text), and HLB is calculated from these values according to the following formula:

$$HLB = 10 \times (\text{Inorganic Value/Organic Value})$$

In the slurry coating of the present invention, the particulate (A) comprises the active hydrogen-containing resin (a1) and preferably contains the curing agent (a2). For example, the resin (a1) and the curing agent (a2) are preferably mixed with each other by dissolving them in an organic solvent or melting and kneading them.

For example, the particulate (A) can be obtained by a process in which a solvent solution of the resin (a1) and preferably the curing agent (a2) is dispersed into water and desolvation of the solvent is carried out, or by a process in which the resin (a1) and preferably the curing agent (a2) are melted and kneaded and the resulting product is pulverized. Alternatively, as described below, the particulate (A) can be formed in the process for preparing the slurry coating, which includes the steps of dispersing a solvent solution of the resin (a1) and preferably the curing agent (a2) into an aqueous medium (M) containing the reactive surfactant (B) and removing the solvent.

In the slurry coating of the present invention, the particulate (A) may be of indefinite shape but preferably of spherical shape in terms of smoothness and evenness of the film. The term "spherical shape" herein refers to the particle shape having a major axis/minor axis ratio in the range of 1.0 to 1.5.

In the slurry coating of the present invention, the particulate (A) preferably has an average particle diameter of 0.1 to 50 μm, more preferably 0.5 to 20 μm, even more preferably 1.0 to 10 μm. The particle diameter may be determined by electron microscope measurement, sedimentation method, electrozone method, dynamic light-scattering method, or the like, and the dynamic light-scattering method is preferred because it can provide a suitable range for the particle size measurement.

The particulate (A) may have a spherical shape with a major axis/minor axis ratio of 1.0 to 1.5, preferably 1.0 to 1.2. The major axis/minor axis ratio can be obtained by the steps of observing the particle with a light microscope, according to the Heywood definition, determining, as the minor axis, the minimum distance between two parallel lines that are tangent to the planar view contour of the particle, determining, as the major axis, the maximum distance between two parallel lines that are perpendicular to the above lines, and calculating a ratio of the determined major axis to the determined minor axis.

Examples of the solvent in which the active hydrogen-containing resin (a1) is to be dissolved include aromatic hydrocarbon solvents, aliphatic or alicyclic hydrocarbon solvents, halide solvents, ester solvents, ester ether solvents, ether solvents, ketone solvents, alcohol solvents, amide solvents, sulfoxide solvents, heterocyclic compound solvents, and mixture solvents of two or more thereof. Preferred examples include ether solvents, ester ether solvents, or aromatic hydrocarbon solvents.

Examples of the aromatic hydrocarbon solvents include toluene, xylene, ethylbenzene, and tetralin.

Examples of the aliphatic or alicyclic hydrocarbon solvents include n-hexane, n-heptane, mineral spirit, and cyclohexane.

Examples of the halide solvents include methyl chloride, methyl bromide, methyl iodide, methylene dichloride, carbon tetrachloride, trichloroethylene, and perchloroethylene.

Examples of the ester solvents include ethyl acetate and butyl acetate.

Examples of the ester ether solvents include methoxybutyl acetate, methyl cellosolve acetate, and ethyl cellosolve acetate.

Examples of the ether solvents include diethyl ether, tetrahydrofuran, dioxane, ethyl cellosolve, butyl cellosolve, and propylene glycol monomethyl ether.

Examples of the ketone solvents include acetone, methyl ethyl ketone, methyl isobutyl ketone, di-n-butyl ketone, and cyclohexanone.

Examples of the alcohol solvents include methanol, ethanol, n-propanol, isopropanol, n-butanol, isobutanol, tert-butanol, 2-ethylhexyl alcohol, and benzyl alcohol.

Examples of the amide solvents include dimethylformamide and dimethylacetamide.

Examples of the sulfoxide solvents include dimethyl sulfoxide.

Examples of the heterocyclic compound solvents include N-methylpyrrolidone.

In the present invention, examples of the resin (a1) having the active hydrogen such as that of an alcoholic hydroxyl group, a phenolic hydroxyl group, an amino group, a carboxylic acid group, a phosphoric acid group, a thiol group, or the like, include (a1(1)) an acrylic resin, (a1(2)) a polyester resin, (a1(3)) a polyurethane resin, and (a1(4)) an epoxy resin, provided that such resins have the active hydrogen.

In the case that the reactive surfactant (B) has the optionally blocked isocyanate group, any of the above resins having the active hydrogen is preferably used together with the reactive surfactant (B), and the acrylic resin (a1(1)) is particularly preferred.

In the case that the reactive surfactant (B) has the epoxy group, the resin having the active hydrogen of the alcoholic hydroxyl group, the carboxylic acid group, the amino group, or the thiol group is preferably used together with the reactive surfactant (B), and the acrylic resin (a1(1)) having the active hydrogen group of the alcoholic hydroxyl group or the carboxylic acid group is particularly preferred.

The equivalent of the active hydrogen in the resin (a1) is preferably 50 to 50,000, more preferably 100 to 10,000, even more preferably 200 to 5,000.

Examples of the monomer for forming the acrylic resin (a1(1)) include (i) (a1(1)1) (meth)acrylic acid or (meth)acrylate ester having an hydroxyl group, (ii) (a1(1)2) (meth)acrylate ester having no hydroxyl group, acrylamide or acrylonitrile, and (iii) (a1(1)3) any other optional monomer.

The weight % ratio of the monomer (a1(1)1)/the monomer (a1(1)2)/the monomer (a1(1)3) in the acrylic resin (a1(1)) is preferably (1 to 100)/(0 to 80)/(0 to 50), more preferably (1 to 50)/(1 to 50)/(0 to 20).

The acrylic resin (a1(1)) is synthesized by any known polymerization method such as solution polymerization, bulk polymerization, suspension polymerization, or the like, and its weight average molecular weight is preferably 1,000 to 200,000, more preferably 2,000 to 100,000, even more preferably 3,000 to 50,000.

Examples of the monomer (a1(1)1) include acrylic acid; methacrylic acid; and hydroxyalkyl (C2 to C4) (meth) acrylate such as 2-hydroxyethyl (meth)acrylate, 2-hydroxypropyl (meth)acrylate, and 4-hydroxybutyl (meth)acrylate.

Preferred examples include 2-hydroxyethyl (meth)acrylate.

Examples of the monomer (a1(1)2) include acrylamide; acrylonitrile; and (meth)acrylate (cyclo)alkyl esters such as esters of (meth)acrylic acid and alcohols having 1 to 25 carbon atoms such as methyl alcohol, ethyl alcohol, butyl alcohol, stearyl alcohol, ethylene glycol, 1,4-butanediol, cyclohexanol, and isoborneol.

Preferred examples include methyl (meth)acrylate and n-butyl (meth)acrylate.

Examples of the monomer (a1(1)3) include styrene, which is preferred.

Examples of the polyester resin (a1(2)) include a condensed polyester polyol formed by the reaction of a low molecular weight polyol or a polyalkylene ether diol, or both, having a weight average molecular weight of 5,000 or less with a polycarboxylic acid; a polylactone diol formed by lactone ring-opening polymerization; and a polycarbonate diol formed by the reaction of a low molecular weight diol with a carbonate diester of a lower alcohol such as methanol.

Examples of the low molecular weight polyol include the low molecular weight diols belonging to the above polyether diol (b5-1).

Examples of the polyalkylene ether diol having a weight average molecular weight of 5,000 or less include polytetramethylene ether glycol, polypropylene glycol, polyethylene glycol, and any combination of two or more thereof.

Examples of the polycarboxylic acid include aliphatic dicarboxylic acids such as succinic acid, adipic acid, azelaic acid, and sebacic acid; aromatic dicarboxylic acids such as terephthalic acid, isophthalic acid, and phthalic acid; ester formable derivatives of these dicarboxylic acids such as acid anhydrides and lower alkyl (C1 to C4) esters; and any combination of two or more thereof. Examples of the lactone include ε-caprolactone, γ-butyrolactone, and γ-valerolactone, and any combination of two or more thereof.

The polyester can be produced by any conventional method such as a method in which the low molecular weight polyol or the polyether polyol, or both, with a weight average molecular weight of 5,000 or less is allowed to react (condensed) with the polycarboxylic acid or its ester formable derivative (such as an anhydride such as maleic anhydride or phthalic anhydride; a lower ester such as dimethyl adipate or dimethyl terephthalate; or halide), or its anhydride and an alkylene oxide such as ethylene oxide or propylene oxide, or both, and the active hydrogen group is allowed to remain by using excess of one component, the polyol, or a method in which the lactone is added to the initiator (the low molecular weight diol or the polyether diol, or both, with a weight average molecular weight of 5,000 or less).

Examples of the polyester resin (a1(2)) include polyethylene adipate diol, polybutylene adipate diol, polyhexamethylene adipate diol, polyneopentyl adipate diol, polyethylenepropylene adipate diol, polyethylenebutylene adipate diol, polybutylenehexamethylene adipate diol, polydiethylene adipate diol, poly(polytetramethylene ether) adipate diol, polyethylene azelate diol, polyethylene sebacate diol, polybutylene azelate diol, polybutylene sebacate diol, polycaprolactone diol or triol, and polyhexamethylene carbonate diol.

The component ratio of the polyol to the polycarboxylic acid in the hydroxyl group-containing polyester can be represented by the mole ratio [OH]/[COOH] of the hydroxyl group [OH] to the carboxylic group [COOH], which is preferably 2/1 to 1/1, more preferably 1.5/1 to 1/1, even more preferably 1.3/1 to 1.02/1. The ratio of the other components may be in the same range, even though such components differ from the above. The weight average molecular weight of the polyester is preferably 1,000 to 50,000, more preferably 2,000 to 20,000, even more preferably 3,000 to 15,000.

Examples of the active hydrogen group in the polyester resin (a 1(2)) include the alcohol-carboxylic acid polycondensation terminal end groups such as the alcoholic hydroxyl group and the carboxylic acid group.

Examples of the polyurethane resin (a1(3)) include polyaddition products of polyol and diisocyanate.

Examples of the diisocyanate include those described above. Examples of the polyol include the compounds having the structure in which an alkylene oxide (hereinafter abbreviated as AO) is added to an active hydrogen atom-containing polyfunctional compound, and any combination of two or more thereof.

Examples of the active hydrogen atom-containing polyfunctional compound include (a1(3)1) polyhydric alcohols, (a1(3)2) polyhydric phenols, (a1(3)3) amines, (a1(3)4) polycarboxylic acids, (a1(3)5) phosphoric acids, and (a1(3)6) polythiols.

Examples of the polyhydric alcohols (a1(3)1) include dihydric alcohols such as ethylene glycol, propylene glycol, 1,3-butylene glycol, 1,4-butanediol, 1,6-hexanediol, diethylene glycol, neopentyl glycol, bis(hydroxymethyl)cyclohexane, and bis(hydroxyethyl)benzene; trihydric to octahydric polyhydric alcohols such as glycerol, trimethylolpropane, pentaerythritol, diglycerol, α-methylglucoside, sorbitol, xylitol, mannitol, dipentaerythritol, glucose, fructose, and sucrose.

Examples of the polyhydric phenols (a1(3)2) include polyhydric phenols such as pyrogallol, catechol, and hydroquinone; and bisphenols such as bisphenol A, bisphenol F, and bisphenol S.

Examples of the amines (a1(3)3) include ammonia; alkyl amines having 1 to 20 carbon atoms such as butyl amine; monoamines such as aniline; aliphatic polyamines such as ethylenediamine, trimethylenediamine, hexamethylenediamine, and diethylenetriamine; heterocyclic polyamines such as piperazine, N-aminoethylpiperazine, and other heterocyclic polyamines disclosed in Japanese Patent Publication No. S55-21044 (1980); alicyclic polyamines such as dicyclohexylmethane diamine and isophorone diamine; aromatic polyamines such as phenylenediamine, tolylenediamine, diethyltolylenediamine, xylylenediamine, diphenylmethanediamine, diphenylether diamine, and polyphenylmethanepolyamine; and alkanol amines such as monoethanolamine, diethanolamine, triethanolamine, and triisopropanolamine.

Examples of the polycarboxylic acids (a1(3)4) include aliphatic polycarboxylic acids such as succinic acid and adipic acid; and aromatic polycarboxylic acids such as phthalic acid, terephthalic acid, and trimellitic acid.

Examples of the phosphoric acids (a1(3)5) include phosphoric acid, phosphorous acid, and phosphonic acid. Examples of the polythiols (a1(3)6) include polythiol compounds formed by the reaction of glycidyl group-containing compounds with hydrogen sulfide.

Two or more of the above active hydrogen atom-containing compounds may be used in combination.

Examples of the AO to be added to the active hydrogen atom-containing compound include ethylene oxide (EO), propylene oxide (PO), 1,2-, 2,3- or 1,3-butylene oxide, tetrahydrofuran (THF), styrene oxide, α-olefin oxide, and epichlorohydrin.

A single AO may be used alone, or two or more AOs may be used in combination. In the latter case, the AO may be added by block addition such as tip type, balance type, and active secondary type, random addition, or combination thereof such as random addition followed by tipping whereby 0 to 50% by weight, preferably 5 to 40% by weight of the ethylene oxide chain is randomly distributed in the molecule, and 0 to 30% by weight, preferably 5 to 25% by weight of the EO chain is tipped at the terminal end of the molecule.

Preferred examples of the AO include EO alone, PO alone, THF alone, combination of PO and EO, and combination of PO or EO, or both, and THF, wherein the combination may be random, block or combination thereof.

The AO can be added to the active hydrogen atom-containing compound by any conventional method, which is carried out in a single stage or multi-stages in the absence or presence of a catalyst such as an alkali catalyst, an amine catalyst, or an acid catalyst (particularly in a later stage for AO addition) under atmospheric or increased pressure.

The unsaturation degree of the polyol is preferably as low as possible, and preferably 0.1 meq/g or less, more preferably 0.05 meq/g or less, even more preferably 0.02 meq/g or less.

The ratio of the polyol to the isocyanate may be represented by the molar ratio [OH]/[NCO] of the hydroxyl group [OH] to the isocyanate group [NCO], which is preferably 2/1 to 1/1, more preferably 1.5/1 to 1/1, even more preferably 1.3/1 to 1.02/1. The ratio of the other components may be in the same range, even though such components differ from the above. The weight average molecular weight is preferably 1,000 to 50,000, more preferably 2,000 to 20,000, even more preferably 3,000 to 15,000.

Examples of the active hydrogen group in the polyurethane resin (a1(3)) include an active hydrogen group that is derived from the active hydrogen atom-containing compound and is not in the urethane bond; and the hydrogen in the urethane bond.

Examples of the epoxy resin (a1(4)) include addition condensation products of (a1(4)1) a polyepoxide and (a1(4)2) a polycarboxylic acid. This addition polymerization generates a hydroxyl group, which has the active hydrogen group.

Examples of the active hydrogen group in the epoxy resin (a1(4)) include an alcoholic active hydrogen group formed by epoxidation.

Examples of the polycarboxylic acid (a1(4)2) include those described above. The polyepoxide (a1(4)1) may be aliphatic, alicyclic, heterocyclic, or aromatic.

Examples of the aromatic polyepoxide (a1(4)1) include glycidyl ethers of polyhydric phenols such as bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl ether, dihydroxybiphenyl diglycidyl ether, octachloro-4,4'-dihydroxybiphenyl diglycidyl ether, glycidyl ethers of phenol or cresol novolak resins, a diglycidyl ether product formed by the reaction of 2 moles of bisphenol A with 3 moles of epichlorohydrin, polyglycidyl ethers formed by the condensation reaction of phenol with glyoxal, glutaraldehyde, or formaldehyde, and polyphenol polyglycidyl ethers formed by the condensation reaction of resorcin and acetone.

In the present invention, examples of the aromatic polyepoxide also include a diglycidyl urethane compound formed by the addition reaction of toluenediisocyanate or diphenylmethane diisocyanate with glycidol, a glycidyl group-containing polyurethane (pre)polymer formed by the reaction of the above two reactants with a polyol, and diglycidyl ethers of bisphenol A-alkylene oxide (ethylene oxide or propylene oxide) adducts.

Examples of the heterocyclic polyepoxide (a1(4)1) include tris(glycidyl)melamine.

Examples of the alicyclic polyepoxide (a1(4)1) include vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyclohexanecarboxylate, bis(3,4-epoxy-6-methylcyclohexylmethyl)adipate, and bis(3,4-epoxy-6-methylcyclohexylmethyl)butylamine. The alicyclic compound also includes nucleus-hydrogenated compounds of the above aromatic polyepoxide compounds.

Examples of the aliphatic polyepoxide (a1(4)1) include polyglycidyl ethers of polyhydric aliphatic alcohols, polyglycidyl esters of polyhydric fatty acids, and glycidyl aliphatic amines.

Examples of the polyglycidyl ethers of the polyhydric aliphatic alcohols include ethylene glycol diglycidyl ether, propylene glycol diglycidyl ether, tetramethylene glycol diglycidyl ether, polyethylene glycol diglycidyl ether, polypropylene glycol diglycidyl ether, trimethylolpropane triglycidyl ether, pentaerythritol tetraglycidyl ether, and sorbitol polyglycidyl ether.

Examples of the polyglycidyl ester of the polyhydric fatty acid include diglycidyl adipate.

Examples of the glycidyl aliphatic amine include N,N,N',N'-tetraglycidylhexamethylenediamine.

In the present invention, the aliphatic compounds also include glycidyl (meth)acrylate (co)polymers.

Preferred examples include the condensation product of bisphenol A diglycidyl ether and adipic acid.

The addition condensation generates the active hydrogen group-containing group and can provide the resin (a1) having the active hydrogen with an active hydrogen equivalent of 50 to 50,000. Therefore, its weight average molecular weight is preferably 1,000 to 200,000, more preferably 2,000 to 100,000, even more preferably 3,000 to 50,000.

In the case that the reactive surfactant (B) has the optionally blocked isocyanate group, the curing agent (a2) may be any compound that has two or more functional groups reactive to the active hydrogen per molecule, for example, including but not limited to an optionally blocked isocyanate group-containing compound, an epoxy group-containing compound, a melamine resin, a silylether group-containing compound, and a (hemi)acetal group-containing compound.

Preferred examples include the optionally blocked isocyanate group-containing compound.

Examples of the optionally blocked isocyanate group-containing compound include the above organic diisocyanates and the modifications thereof such as urethane group-, carbodiimide group-, allophanate group-, urea group-, biuret group-, isocyanurate group- or oxazolidone group-containing modifications; HDI isocyanurate; HDI biuret; IPDI isocyanurate; IPDI biuret; crude MDI [phosgenated compounds of crude diaminodiphenylmethane (such as a condensation product of formaldehyde and an aromatic amine (aniline) or a mixture thereof, and a mixture of diaminodiphenylmethane and a small amount (for example, 5 to 20% by mass) of tri- or more-functional polyamine)]; polyallylpolyisocyanate (PAPI) and blocked isocyanate compounds thereof.

Preferred examples include HDI isocyanurate and IPDI isocyanurate.

Examples of the blocking agent include those described above and any combination of two or more thereof.

The ratio of the active hydrogen-containing resin (a1) to the curing agent (a2) having the optionally blocked isocyanate group can be represented by the molar ratio of the active hydrogen group of the resin (a1) to the isocyanate group of the curing agent (a2), which is preferably 1/1 or more and 2/1 or less, more preferably 1.2/1 or more and 1.8/1 or less, even more preferably 1.3/1 or more and 1.6/1 or less.

Examples of the epoxy group-containing compound include aliphatic, alicyclic, heterocyclic, or aromatic polyepoxide compounds such as the above polyepoxide compounds.

Preferred examples include the polyglycidyl ethers of the polyhydric aliphatic alcohols and the glycidyl ethers of the polyhydric phenols.

The ratio of the active hydrogen-containing resin (a1) to the curing agent (a2) having the epoxy group can be represented by the molar ratio of the active hydrogen group of the resin (a1) to the epoxy group of the curing agent (a2), which is preferably 1/1 or more and 2/1 or less, more preferably 1.2/1 or more and 1.8/1 or less, even more preferably 1.3/1 or more and 1.6/1 or less.

In the case that the reactive surfactant (B) has the epoxy group, the curing agent (a2) may be any compound that has two or more functional groups reactive to the active hydrogen per molecule, including but not limited to the above-described compounds.

Preferred examples include the epoxy group-containing compounds and the optionally blocked isocyanate group-containing compounds.

In the slurry coating of the present invention, the content of the reactive surfactant (B) based on the total weight of the particulate (A) and the reactive surfactant (B) is preferably 0.1 to 10% by weight, more preferably 0.5 to 8% by weight, most preferably 1 to 5% by weight. In the case that the nonreactive surfactant (B') is used in combination, the total content of the reactive surfactant (B) and the nonreactive surfactant (B') is preferably in the above range.

The content of the resin in the slurry coating of the present invention is preferably 20 to 75% by weight, more preferably 20 to 60% by weight. The dispersion preferably has a viscosity of 10 to 100,000 mPa·s, more preferably 50 to 5,000 mPa·s at 25° C. The resin in the slurry coating may have a particle diameter of 0.1 to 50 μm.

A resin content of 20 to 75% by weight can provide good dispersed condition of the particulate (A) in water. A dispersion viscosity of 10 to 100,000 mPa·s can make the handling of the coating easy. An average particle diameter of the particulate (A) of 0.1 to 50 μm can prevent the precipitation of the particles in water and facilitate the water vaporization in baking and the viscosity control.

As far as the advantageous effects of the present invention are not deteriorated, if necessarily, the reactive surfactant (B) may be used in combination with any other known emulsifier or surfactant (including a nonionic emulsifier or surfactant, an anionic emulsifier or surfactant, a cationic emulsifier or surfactant, or various reactive emulsifiers or surfactants). The content of the combined other emulsifier or surfactant based on the total weight of the emulsifier or surfactant is preferably 44% by weight or less, more preferably 37% by weight or less.

In the present invention, examples of the aqueous medium (M) include such as, for example, water, or a mixture of water and a water-miscible solvent such as an alcohol (such as methanol or isopropanol) or a ketone solvent such as acetone. The mixing ratio of the water-miscible solvent/water is preferably from 0.1/99.9 to 10/90.

In the present invention, examples of the catalyst (C) include (c1) a cyclic amidine, (c2) a cyclic tertiary amidine salt, and (c3) a cyclic quaternary amidinium salt, and two or more thereof may be used in combination. Preferred examples include the cyclic amidine (c1).

A cyclic amidine (c1) represented by the general formula (2) may also be used.

wherein $T^1$ and $T^2$ are the same or different and each represent a hydrogen atom or a monovalent hydrocarbon group having 1 to 20 carbon atoms optionally substituted with a hydroxyl group, wherein $T^1$ may form a ring together with $T^2$, C and N, D represents a divalent hydrocarbon group having 2 to 10 carbon atoms optionally substituted with an amino group, a nitro group, a cyano group, a carboxyl group, an aldehyde group, or a monovalent hydrocarbon group having 1 to 5 carbon atoms, such as an alkylene group, an arylene group, and an alkenylene group.

Examples of $T^1$ and $T^2$ include a methyl group, an ethyl group, a n- or i-propyl group, a n-, i-, tert-, or sec-butyl group, a phenyl group, a benzyl group, and a hydroxyethyl group.

Examples of D include an ethylene group, a propylene group, a methylethylene group, an ethenyl group, a methylethenyl group, an aminoethylene group, a nitroethylene group, a cyanoethylene group, a carboxyethylene group, and a formylethylene group.

Examples of the cyclic amidine (c1) represented by above general formula (2) include compounds having an imidazole ring, a 2-imidazoline ring, or a tetrahydropyrimidine ring as shown in the following:

(1) Imidazole Monocyclic Compounds:

imidazole homologs such as imidazole, 1-methylimidazole, 1-phenylimidazole, 1-benzylimidazole, 1,2-dimethylimidazole, 1-ethyl-2-methylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, and 1,4-dimethyl-2-ethylimidazole;

oxyalkyl derivatives such as 1-methyl-2-oxymethylimidazole, 1-methyl-2-oxyethylimidazole, 1-methyl-4-oxymethylimidazole, 1-(β-oxyethyl)-imidazole, 1-methyl-2-ethoxymethylimidazole, and 1-ethoxymethyl-2-methylimidazole;

nitro and amino derivatives such as 1-methyl-4(5)-nitroimidazole, 1,2-dimethyl-4(5)-nitroimidazole, 1,2-dimethyl-5(4)-aminoimidazole, 1-methyl-4(5)-(2-aminoethyl)imidazole, and 1-(β-aminoethyl)imidazole;

(2) Benzimidazole Compounds:

benzimidazole, 1-methylbenzimidazole, 1-methyl-2-benzylbenzimidazole, 1-methyl-5(6)-nitrobenzimidazole, and the like;

(3) Compounds Having 2-Imidazoline Ring:

2-imidazoline, 1-methylimidazoline, 1,2-dimethylimidazoline, 1,2,4-trimethylimidazoline, 1,4-dimethyl-2-ethylimidazoline, 1-methyl-2-phenylimidazoline, 1-methyl-2-benzylimidazoline, 1-methyl-2-oxyethylimidazoline, 1-methyl-2-heptylimidazoline, 1-methyl-2-undecylimidazoline, 1-methyl-2-heptadecylimidazoline, 1-(β-oxyethyl)-2-methylimidazoline, 1-methyl-2-ethoxymethylimidazoline, 1-ethoxymethyl-2-methylimidazoline, and the like; and (4) Compounds Having Tetrahydropyrimidine Ring:

tetrahydropyrimidine, 1-methyl-1,4,5,6-tetrahydropyrimidine, 1,2-dimethyl-1,4,5,6-tetrahydropyrimidine, 1,8-diazabicyclo [5.4.0]undecene-7, 1,5-diazabicyclo[4.3.0]nonene-5, and other compounds disclosed in Japanese Patent Publication No. S46-37503 (1971).

Preferred examples include the compounds having the imidazole ring, 2-imidazoline ring or tetrahydropyrimidine ring, and particularly 1-methylimidazole, 1,2-dimethylimidazole, 1,4-dimethyl-2-ethylimidazole, 1-methylbenzimidazole, 1,2-dimethylimidazoline, 1,2,4-trimethylimidazoline, 1,4-dimethyl-2-ethylimidazoline, 1-methyl-2-heptylimidazoline, 1,2-dimethyl-1,4,5,6-tetrahydropyrimidine, 1,8-diazabicyclo [5.4.0]undecene-7, and 1,5-diazabicyclo[4.3.0]nonene-5.

Examples of the cyclic tertiary amidine catalyst (c2) include organic acid salts or inorganic acid salts of the cyclic amidine (c1).

Examples of the organic acid for the organic acid salts of the cyclic amidine (c1) include aliphatic monocarboxylic acids such as formic acid, acetic acid, octylic acid, and 2-ethylhexanoic acid; aliphatic polycarboxylic acids such as oxalic acid, malonic acid, succinic acid, glutaric acid, and adipic acid; aromatic monocarboxylic acids such as benzoic acid, toluic acid, and ethylbenzoic acid; aromatic polycarboxylic acids such as phthalic acid, isophthalic acid, terephthalic acid, nitrophthalic acid, and trimellitic acid; phenol compounds such as phenol and resorcin; sulfonic acid compounds such as alkylbenzenesulfonic acid, toluenesulfonic acid, and benzenesulfonic acid; and phosphoric acid compounds. Any combination of two or more of the organic acids may be used. Preferred examples include the aliphatic carboxylic acid compounds and the aromatic carboxylic acid compounds, and particularly octylic acid and formic acid.

Examples of the inorganic acid for the inorganic acid salts of the cyclic amidine (c1) include hydrochloric acid, sulfuric acid, phosphoric acid, tetrafluoroboric acid, perchloric acid, hexafluorophosphoric acid, hexafluoroantimonic acid, hexafluoroarsenic acid, and trifluoromethanesulfonic acid. Preferred examples include phosphoric acid.

The cyclic quaternary amidinium salt (c3) is generally composed of a cation formed by quaternarizing the cyclic amidine (c1) as shown above and an acid anion.

For example, J. Am. Chem. Soc., 69, 2269 (1947) disclose a method for quaternarizing the cyclic amidine (c1) with a quaternarizing agent of an alkyl halide. Examples of the other agent for quaternarization include dialkyl sulfate, sulfonate esters (U.S.S.R. SU176290), dimethyl carbonate (U.S. Pat. No. 2,635,100), phosphate esters (Journal. Prakt. Chemie. Band 317, Heft 5, 1975, 733) and epoxy group-containing compounds (U.S. Pat. No. 2,127,476). If it is necessary to convert the anion component of the formed quaternary compound into a specific anion to form the quaternary salt (c3), specifically if an organic anion should be substituted after the quaternarization of the cyclic amidine (c1) with the alkyl halide, for example, the halide ion formed by the quaternarization can be replaced with a hydroxide ion, and then an organic acid can be allowed to react to form a desired quaternary salt having the organic acid anion.

Preferred examples of the quaternary salt (c3) include the product formed by the steps of allowing the cyclic amidine (c1) to react with a quaternarizing agent having an optionally hydroxyl group-containing C1 to C11 alkyl or arylalkyl group and optionally substituting a preferred acid anion. The product is a salt composed of a cation having the structure in which the C1 to C11 alkyl or arylalkyl group is coupled to one nitrogen atom of the cyclic amidine (c1); and the acid anion.

Examples of the acid for forming the anion in the quaternary salt (c3) include the organic or inorganic acids as shown in the following:

(1) Carboxylic Acids:

polycarboxylic acids (dihydric to tetrahydric polycarboxylic acids) such as aliphatic polycarboxylic acids (saturated polycarboxylic acids such as oxalic acid, malonic acid, succinic acid, glutaric acid, adipic acid, pimelic acid, suberic acid, azelaic acid, and sebacic acid; unsaturated polycarboxylic acids such as maleic acid, fumaric acid, and itaconic acid); aromatic polycarboxylic acids such as phthalic acid, isophthalic acid, terephthalic acid, trimellitic acid, and pyromellitic acid; S-containing polycarboxylic acids such as thiodipropionic acid;

oxycarboxylic acids such as aliphatic oxycarboxylic acids such as glycolic acid, lactic acid, and tartaric acid; and aromatic oxycarboxylic acids such as salicylic acid and mandelic acid;

monocarboxylic acids such as aliphatic monocarboxylic acids having 1 to 30 carbon atoms (saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid; unsaturated monocarboxylic acids such as acrylic acid, methacrylic acid, and oleic acid); aromatic monocarboxylic acids such as benzoic acid, cinnamic acid, and naphthoic acid;

(2) Phenols:

monohydric phenols such as phenol; alkyl phenols such as cresol, xylenol, ethylphenol, n- or isopropylphenol, n- or isoamylphenol, isononylphenol, and isododecylphenol; methoxyphenols such as eugenol and guaiacol; naphthol; and cyclohexylphenol;

polyhydric phenols such as catechol, resorcin, pyrogallol, and phloroglucin;

(3) Monoalkyl or Dialkyl Phosphate Esters:

monomethyl or dimethyl phosphate ester, monoisopropyl or diisopropyl phosphate ester, monobutyl or dibutyl phosphate ester, mono or di-(2-ethylhexyl)phosphate ester, and monoisodecyl or diisodecyl phosphate ester;

(4) Sulfonic Acids:

p-toluenesulfonic acid, dodecylbenzenesulfonic acid, and sulfosalicylic acid; and (5) Inorganic Acids:

the inorganic acids as shown above.

Preferred examples of the acid include the carboxylic acids and the monoalkyl or dialkyl phosphate esters, and phthalic acid and maleic acid are particularly preferred.

The content of the catalyst (C) based on the total weight of the resin (a1) having the active hydrogen and the curing agent (a2) having the blocked isocyanate group is preferably 0.1% by weight or more, more preferably 0.5% by weight or more, particularly preferably 1% by weight or more; preferably 10% by weight or less, more preferably 6% by weight or less, particularly preferably 4% by weight or less. If the catalyst (C) content is from 0.1% to 10% by weight, the resulting water-dispersed powder slurry coating can provide a film with high hardness.

Depending on the desired use, the slurry coating according to the present invention may contain any known additive such as a viscoelasticity adjusting agent, a dynamic surface tension adjusting agent, a filler, a thickener, a heat resistance or weather resistance stabilizer, a leveling agent, an antifoamer, a preservative, and a coloring agent, as needed.

Examples of the viscoelasticity adjusting agent include polymer-type viscoelasticity adjusting agents such as polycarboxylic acids, polysulfonic acids, polyether-modified carboxylic acids, and polyethers; and association-type viscoelasticity adjusting agents such as urethane-modified polyethers. The reactive surfactant (B) may be used as the reactive viscoelasticity-adjusting agent (d1). The content of the viscoelasticity adjusting agent based on the slurry coating is preferably from 0.05% to 10.0%, more preferably from 0.1% to 5%.

Examples of the dynamic surface tension adjusting agent include acetylene glycol dynamic surface tension adjusting agents, fluoride dynamic surface tension adjusting agents, and silicone dynamic surface tension adjusting agents. The content of the dynamic surface tension adjusting agent based on the slurry coating is preferably from 0.05% to 20.0%, more preferably from 0.1% to 10%.

Examples of the weather resistance stabilizer include a salicylic acid-type UV absorber such as phenyl salicylate and p-tert-butylphenyl salicylate; a benzophenone-type UV absorber such as 2,4-dihydroxybenzophenone and 2-hydroxy-4-methoxybenzophenone; a benzotriazole-type UV absorber such as 2-(2'-hydroxy-5'-methylphenyl)benzotriazole and 2-(2'-hydroxy-5'-tert-butylphenyl)benzotriazole; a cyanoacrylate-type UV absorber such as 2-ethylhexyl-2-cyano-3,3'-diphenylacrylate; and a hindered amine light stabilizer such as octylated diphenylamine and isooctyl-3-(3,5-di-tert-butyl-4-hydroxyphenol)propionate. The content of the weather resistance stabilizer based on the slurry coating is preferably from 0.05% to 10%, more preferably 0.5% to 3%.

Examples of the leveling agent include but are not limited to olefin resins such as low molecular weight polyethylene and low molecular weight polypropylene; olefin copolymers such as ethylene-acryl copolymers and ethylene-methacryl copolymers; (meth)acryl copolymers; and polyvinyl pyrrolidone. The content of the leveling agent based on the slurry coating is preferably from 0.2% to 6%, more preferably from 0.5% to 3%.

Any coloring agent may be used as needed, including but not limited to an inorganic pigment, an organic pigment, and a dye. Examples of the inorganic pigment include titanium oxide, carbon black, chromium oxide, and ferrite. Examples of the organic pigment include azo pigments such as azo lakes, monoazo types, diazo types, and chelate azo types; and polycyclic pigments such as benzimidazolone types, phthalocyanine types, quinacridone types, dioxazine types, isoindolinone types, thioindigo types, perylene types, quinophthalone types, and anthraquinone types. Examples of the dye include nigrosine types and aniline types. The content of the coloring agent based on the slurry coating is preferably from 0.5% to 30%, more preferably from 1.0% to 10%.

Examples of the method for preparing the slurry coating of the present invention include but are not limited to the following:

(1) Desolvation Method

The reactive surfactant (B), and optionally the nonreactive surfactant (B') and the reactive viscoelasticity adjusting agent (d1) are contained in an aqueous medium (M), and the resin (a1), and optionally the curing agent (a2) and the catalyst (C) are dissolved in the organic solvent as described above. Alternatively, the reactive surfactant (B), and optionally the nonreactive surfactant (B') and the catalyst (C) are contained in the aqueous medium, and the resin (a1) and the curing agent (a2), and optionally the reactive viscoelasticity adjusting agent (d1) are dissolved in the organic solvent as described above. In a reaction vessel, the organic solvent solution is dispersed into the aqueous medium by using a homomixer or the like. Optionally while heated up to 100° C., the dispersion is subjected to a reduced pressure of 0.1 to 15 Torr so that the water-miscible solvent and the organic solvent are removed, but the water is allowed to remain. The resulting product is a dispersion comprising water and the resin particles with an average particle diameter of 0.1 $\mu$m to 50 $\mu$m dispersed in the water.

(2) Pulverized Particle Dispersion Method

The resin (a1), and optionally the curing agent (a2) and the reactive viscoelasticity adjusting agent (d1) are melted and kneaded, and then cooled and pulverized into resin particles with an average particle diameter of 0.1 to 50 $\mu$m. In a reaction vessel, the resin particles are dispersed into an aqueous medium (M) containing the reactive surfactant (B), and optionally the nonreactive surfactant (B') and the catalyst (C) by using a disperser of the like. Alternatively, the resin (a1), and optionally the curing agent (a2) and the catalyst (C) are melted and kneaded to form resin particles, which are dispersed into an aqueous medium (M) containing the reactive surfactant (B), and optionally the nonreactive surfactant (B') and the reactive viscoelasticity adjusting agent (d1) by using a disperser or the like in a reaction vessel.

In above process (1), the concentration of the resin (a1) and optionally the curing agent (a2) in the organic solvent is preferably 20 to 75% by weight, more preferably 40 to 60% by weight.

In above process (1) or (2), the concentration of the resin (a1) and optionally the curing agent (a2) in the dispersion is preferably 5 to 70% by weight, more preferably 30 to 60% by weight. The viscosity of the dispersion at 25° C. is preferably 50 to 300,000 mPa·s, more preferably 100 to 10,000 mPa·s, even more preferably 1,000 to 8,000 mPa·s.

In above process (1), the temperature within the system is preferably −5 to 100° C., more preferably 30 to 80° C., and the desolvation time is preferably 0.1 to 50 hours, more preferably 2 to 10 hours.

Examples of the dispersing device for the above processes include a homomixer, a high pressure homomixer, a disperser, a high pressure homogenizer, a static mixer, a membrane emulsifier, Filmix, and an ultrasonic wave dispersing machine. Preferred examples include the homomixer.

In the present invention, the reactive surfactant (B) shows good surface activity and good dispersing stability. In addition, when the dispersion is applied and baked, the surfactant is allowed to form a chemical bond to the dispersed material and incorporated into the film so that the film can be excellent in water resistance and strength.

The water-dispersed powder slurry coating of the present invention can be applied by using conventional coating equipment for water-based coatings or solvent-based coatings, such as a spray-coating machine, with no need for newly developed equipment.

In a process for forming a film, the slurry coating is applied to an object by spray coating to have a wet film thickness of preferably from 10 $\mu$m to 200 $\mu$m, more preferably from 10 $\mu$m to 100 $\mu$m. While the coating is flying from the spray nozzle to the object, the water evaporates from the coating so that the resin content increases. The resin content (% by weight) of the coating at the time of the coating arrival at the object can be calculated as the difference between 100 and a value that is obtained by dividing the difference between the applied coating weight and the film weight after heating by the applied coating weight. Such a content is preferably from 50% by weight to 95% by weight, more preferably from 60% by weight to 90% by weight. If the resin content is 50% by weight or more at the time of the coating arrival, the coating can be prevented from dripping and can form a smooth film.

The coated object is heated at a temperature of preferably from 100° C. to 200° C., more preferably from 120° C. to 180° C. for a time period of preferably from 5 to 60 minutes, more preferably from 5 to 30 minutes, particularly preferably from 5 to 20 minutes to have a film formed.

After the application and baking of the coating of the present invention, the resulting film formed on the object preferably have a thickness from 10 $\mu$m to 150 $\mu$m, more preferably from 15 $\mu$m to 50 $\mu$m.

The content of the extract from the film formed after the curing of the water-dispersed powder slurry coating of the present invention is preferably 10% or less, more preferably 5% or less, even more preferably 1% or less, most preferably 0.1% or less of the content of the extract from the film before the curing.

If the value obtained by dividing the content of the extract from the film after the curing by that before the curing (hereinafter referred to as the "extract content ratio") is 10% or less, the additives remaining in the film can be prevented from leaching (solving out) into acid rain and from deteriorating the film, and therefore extract products can be prevented, which would otherwise be oxidatively altered as the acid rain vaporizes and aggregate to deteriorate the appearance of the film.

The extract content ratio is a ratio of the extract content obtained by extraction of said film with ethanol at 78° C. for two hours to the extract content obtained by extraction of a film before curing which is formed by applying the water-dispersed powder slurry coating of the present invention with ethanol at 78° C. for two hours.

In the above curing process, the water-dispersed powder slurry coating can be applied to, for example, a zinc phosphate-treated steel plate by spray coating and pre-baked at preferably 80° C. for 10 minutes, and then baked at preferably 150° C. for 20 minutes and dried.

The water-dispersed powder slurry coating according to the present invention will be useful particularly as a top coat for automobiles and useful in coating of architectural structures, electrical appliances, and various other products.

EXAMPLES

The present invention is described in more detail by showing examples in the following, but such examples are not intended to limit the scope of the present invention. Hereinafter, the term "part(s)" mean "part(s) by weight", and "%" means "% by weight."

In the examples below, the molecular weight of the reactive surfactant (B), the resin (a1) having the active hydrogen, or the adduct (b3) is determined by GPC.

Synthesis Example 1

To a reaction vessel equipped with a stirrer, a dropping funnel, a nitrogen gas introducing tube, a thermometer, and a reflux condenser were added 53 parts of 4-$\alpha$-cumylphenol and 23 parts of a Lewis acid catalyst (GalleonEarth, manufactured by MIZUSAWA INDUSTRIAL CHEMICALS, LTD.). With stirring, the space of the system was replaced with nitrogen gas, and the materials were heated to 90° C. At the same temperature, 410 parts of an ethanol-blocked product of 3-isopropenyl-$\alpha,\alpha$-dimethylbenzyl isocyanate was added dropwise over a time period of 3 hours and allowed to react at the same temperature for 5 hours. The reaction mixture was cooled to 30° C., and then the catalyst was separated by filtration so that 463 parts of an adduct of 7 moles of the ethanol-blocked product of 3-isopropenyl-$\alpha$, $\alpha$-dimethylbenzyl isocyanate and 1 mole of the 4-$\alpha$-cumylphenol was obtained (1,900 in number average molecular weight) (B0-1). At 80° C., 31.1 parts of an adduct of EO and the B0-1 (45% in EO content), 66.2 parts of polyethylene glycol (6,000 in number average molecular weight), and 2.6 parts of hexamethylenediisocyanate (hereinafter referred to as HDI) were allowed to react for 3 hours, giving 100 parts of a reactive surfactant (B-1) with an oxyethylene unit content of 66% by weight and a weight average molecular weight of 27,000.

Synthesis Example 2

The Friedel-Crafts reaction was carried out in a similar manner to Synthesis Example 1 to form a hydroxyl group-containing hydrocarbon, which was an adduct of EO and the addition reaction product of 2 moles of styrene and 5 moles of an ethanol-blocked product of 3-isopropenyl-($\alpha,\alpha$-dimethylbenzyl isocyanate with 1 mole of 4-$\alpha$-cumylphenol (10% in EO content and 1,800 in number average molecular weight). At 80° C., 16.5 parts of the hydroxyl group-containing hydrocarbon, 81.4 parts of polyethylene glycol (9,000 in number average molecular weight), and 2.2 parts of TDI were allowed to react for 3 hours, giving 100 parts of a reactive surfactant (B-2) with an oxyethylene unit content of 80% by weight and a weight average molecular weight of 33,000.

Synthesis Example 3

The Friedel-Crafts reaction was carried out in a similar manner to Synthesis Example 1 to form a hydroxyl group-containing hydrocarbon, which was an adduct of EO and the addition reaction product of 7 moles of styrene and 2 moles of an ethanol-blocked product of 3-isopropenyl-$\alpha,\alpha$-dimethylbenzyl isocyanate with 1 mole of 4-$\alpha$-cumylphenol (10% in EO content and 2,000 in number average molecular weight). At 80° C., 32.1 parts of the hydroxyl group-containing hydrocarbon, 61.6 parts of polyethylene glycol (3,000 in number average molecular weight), and 6.8 parts of IPDI were allowed to react for 3 hours, giving 100 parts of a reactive surfactant (B-3) with an oxyethylene unit content of 60% by weight and a weight average molecular weight of 15,000.

Synthesis Example 4

The Friedel-Crafts reaction was carried out in a similar manner to Synthesis Example 1 to form a hydroxyl group-containing hydrocarbon, which was an adduct of EO and the addition reaction product of 5 moles of styrene and 1 mole of styrene-p-glycidyl ether with 1 mole of phenol (40% in EO content and 1,000 in number average molecular weight). At 80° C., 10.5 parts of the hydroxyl group-containing hydrocarbon, 87.1 parts of polyethylene glycol (9,000 in number average molecular weight), and 2.3 parts of HDI were allowed to react for 3 hours, giving 100 parts of a reactive surfactant (B-4) with an oxyethylene unit content of 80% by weight and a weight average molecular weight of 31,000.

Synthesis Example 5

The Friedel-Crafts reaction was carried out in a similar manner to Synthesis Example 1 to form a hydroxyl group-containing hydrocarbon, which was an adduct of EO and the addition reaction product of 3 moles of styrene, 3 moles of 3-isopropenyl-α,α-dimethylbenzyl isocyanate, and 2,3-diglycidyloxystyrene with 1 mole of 4-α-cumylphenol (5% in EO content and 1,300 in number average molecular weight). At 80° C., 29.4 parts of the hydroxyl group-containing hydrocarbon, 65.1 parts of polyethylene glycol (3,000 in number average molecular weight), and 5.5 parts of HDI were allowed to react for 3 hours, giving 100 parts of a reactive surfactant (B-5) with an oxyethylene unit content of 26% by weight and a weight average molecular weight of 12,000.

Synthesis Example 6

The Friedel-Crafts reaction was carried out in a similar manner to Synthesis Example 1 to form a hydroxyl group-containing hydrocarbon, which was an adduct of PO and the addition reaction product of 5 moles of styrene and 2 moles of an ethanol-blocked product of 3-isopropenyl-α,α-dimethylbenzyl isocyanate with 1 mole of 4-α-cumylphenol (15% in PO content and 3,200 in number average molecular weight). To 86.4 parts of the hydroxyl group-containing hydrocarbon was added 13.6 parts of sulfuric anhydride in such limited amounts that heat generation was prevented, and allowed to react at 80° C. for 3 hours and then neutralized with sodium hydroxide, resulting in 100 parts of a reactive surfactant (B-6) with a hydrophilic group content of 16% by weight and a weight average molecular weight of 8,000.

Synthesis Example 7

The Friedel-Crafts reaction was carried out in a similar manner to Synthesis Example 1 to form a hydroxyl group-containing hydrocarbon, which was an adduct of EO and the addition reaction product of 7 moles of a methyl ethyl ketone oxime-blocked product of 3-isopropenyl-α,α-dimethylbenzyl isocyanate with 1 mole of phenol (10% in EO content and 1,800 in number average molecular weight). At 15° C., 52.6 parts of the hydroxyl group-containing hydrocarbon, 65 parts of glacial acetic acid, and 52.6 parts of sodium dichromate dihydrate were allowed to react for 5 hours to form a carboxylic acid. The resulting carboxylic acid was allowed to react with 44 parts of aminoethylethanolamine at 230° C. for 12 hours, giving 100 parts of a reactive surfactant (B-7) with a hydrophilic group content of 27% by weight and a weight average molecular weight of 5,800.

Synthesis Example 8

The Friedel-Crafts reaction was carried out in a similar manner to Synthesis Example 1 to form a hydroxyl group-containing hydrocarbon, which was an adduct of PO and the addition reaction product of 5 moles of styrene and 2 moles of an ethanol-blocked product of 3-isopropenyl-α,α-dimethylbenzyl isocyanate with 1 mole of phenol (15% in PO content and 7,200 in number average molecular weight). To 51.4 parts of the hydroxyl group-containing hydrocarbon was added dropwise 15.2 parts of acrylonitrile in the presence of 0.5 parts of potassium hydroxide at 60° C. over a time period of 1 hour. The reaction mixture was then allowed to react in 300 parts of methanol by using 0.2 parts of cobalt at 80° C. for 6 hours in hydrogen gas, giving 66.4 parts of an amino group-containing hydrocarbon (BO-6). After the BO-6, 10.6 parts of sodium hydroxide, and 24.5 parts of methyl chloride were allowed to react at 150° C. for 6 hours to form a tertiary ammonium, the reaction mixture was allowed to react with 73.6 parts of a 30% aqueous solution of sodium monochloroacetate at 70° C. for 5 hours, giving 100 parts of a reactive surfactant (B-8) with a hydrophilic group content of 21% by weight and a weight average molecular weight of 8,000.

Comparative Synthesis Example 1

At 80° C., 19.3 parts of polyoxyalkylene monool (an adduct of ethylene oxide and the addition reaction product of 7 moles of styrene with 4-α-cumylphenol, 60% in EO content and 1,500 in number average molecular weight), 77.4 parts of polyethylene glycol (6,000 in number average molecular weight), and 3.3 parts of HDI were allowed to react for 3 hours, giving 100 parts of a surfactant (B'-9) with a hydrophilic group content of 77% by weight and a weight average molecular weight of 18,000.

Preparation of Acrylic Hydroxy-Functional Resin

To a reaction vessel was added 250 parts of xylene and heated to 100° C. The mixture of the following components (1) to (5) was added dropwise to the reaction vessel over a time period of about 3 hours, while the reaction was carried out under a nitrogen atmosphere. After the dropwise addition was completed, the reaction was allowed to proceed for 2 hours while the temperature was maintained at 100° C.

| | |
|---|---|
| (1) styrene | 23 parts |
| (2) methyl methacrylate | 23 parts |
| (3) butyl acrylate | 20 parts |
| (4) hydroxyethyl acrylate | 33 parts |
| (5) Peroxy D (peroxide manufactured by Nippon Oil & Fats Co., Ltd.) | 1 part |

After the reaction was completed, the organic solvent and the remaining monomer were removed by vacuum distillation. The reaction product was then dried under vacuum, giving an acrylic hydroxy-functional resin (acrylic resin 1) with a hydroxyl group equivalent of 420 and a weight average molecular weight of 30,000.

At 100° C., 59 parts of the resulting acrylic resin 1 and 41 parts of an MEK oxime-blocked HDI isocyanurate (DURANATE manufactured by Asahi Kasei Corporation) were kneaded by using a heating kneader and then pulverized into about 5 μm, giving an acrylic resin 2 with an average particle diameter of 7 μm and a major axis/minor axis ratio of 1.2.

Preparation of Polyester Resin

To a reaction vessel were added 200 parts of neopentyl glycol, 93 parts of ethylene glycol, and 355 parts of terephthalic acid, heated to 230° C., and allowed to react for 2 hours, while the generated water was removed. Thereafter, 0.2 parts of dibutyltin oxide was added, and the reaction was allowed to proceed until the acid value became 0.5 or less so that a polyester resin having hydroxyl groups at both terminal ends, 14,000 in weight average molecular weight and 16.5 mgKOH/g in hydroxyl value was obtained (polyester resin 1).

At 100° C., 93 parts of the resulting polyester resin 1 and 7 parts of an MEK oxime-blocked HDI isocyanurate (DURANATE manufactured by Asahi Kasei Corporation) were kneaded by using a heating kneader and then pulverized into about 5 μm, giving a polyester resin 2 with an average particle diameter of 7 μm and a major axis/minor axis ratio of 1.2.

Examples of Dispersion Preparation

Into 100 parts of water was dispersed 3 parts of each of the reactive surfactants (B-1) to (B-8) obtained in Synthesis Examples 1 to 8, the surfactant (B'-9) obtained in Comparative Synthesis Example 1, a low molecular weight surfactant (B'-10) (an EO adduct of octyl phenol, 1,000 in number average molecular weight), and PVA (B'-11) (a partially saponified polyvinyl alcohol, 1,700 in polymerization degree and 88% in saponification degree) to form a dispersion. The resulting products were named "dispersion 1" to "dispersion 11" respectively.

Examples 1 to 8 and Comparative Examples 1 to 3

In a beaker were mixed 59 parts of the acrylic resin 1, 41 parts of an MEK oxime-blocked HDI isocyanurate (DURANATE manufactured by Asahi Kasei Corporation), and 100 parts of tetrahydrofuran. The resulting mixture was added to 100 parts of each of the dispersions 1 to 11 and then subjected to mixing at a velocity of 9,000 rpm for 1 minute by using an ultra-disperser (manufactured by YAMATO SCIENTIFIC CO., LTD.) to have an average particle diameter of 5 μm. After the mixing, the mixture was poured into a four-neck flask equipped with a stirring rod and a thermometer and then subjected to desolvation under reduced pressure at 25° C. for 10 hours. Subsequently, 0.1 parts of a urethane forming catalyst (TEDA manufactured by Tosoh Corporation), 0.1 parts of a light-resisting stabilizer (DIC-TBS manufactured by DAINIPPON INK AND CHEMICALS, INCORPORATED.), and 3.0 parts of a viscoelasticity imparting agent (SN thickener-651 manufactured by San Nopco Limited.) were added to form a slurry coating having each average particle diameter and major axis/minor axis ratio of the dispersed particle, and having each viscosity, as shown in Table 1.

Examples 9 to 16 and Comparative Examples 4 to 6

To 100 parts of each of the dispersions 1 to 11 obtained in Examples of Dispersion Preparation was added 100 parts of fine powder of the acrylic hydroxy-functional resin (the acrylic resin 2). The mixture was subjected to mixing at a velocity of 9,000 rpm for 1 minute by using an ultra-disperser (manufactured by YAMATO SCIENTIFIC CO., LTD.). Subsequently, 0.1 parts of a urethane forming catalyst (TEDA manufactured by Tosoh Corporation) and 0.1 parts of a light-resisting stabilizer (DIC-TBS manufactured by DAINIPPON INK AND CHEMICALS, INCORPORATED.) were added to form a slurry coating having each average particle diameter and major axis/minor axis ratio of the dispersed particle, and having each viscosity, as shown in Table 2.

Examples 17 to 24 and Comparative Examples 7 to 9

In a beaker were mixed 93 parts of the polyester resin 1, 7 parts of an MEK oxime-blocked HDI isocyanurate (DURANATE manufactured by Asahi Kasei Corporation), and 100 parts of tetrahydrofuran. The resulting mixture was added to 100 parts of each of the dispersions 1 to 11 and then subjected to mixing at a velocity of 9,000 rpm for 1 minute by using an ultra-disperser (manufactured by YAMATO SCIENTIFIC CO., LTD.) to have an average particle diameter of 5 μm. After the mixing, the mixture was poured into a four-neck flask equipped with a stirring rod and a thermometer and then subjected to desolvation under reduced pressure at 25° C. for 10 hours. Subsequently, 0.1 parts of a urethane forming catalyst (TEDA manufactured by Tosoh Corporation), 0.1 parts of a light-resisting stabilizer (DIC-TBS manufactured by DAINIPPON INK AND CHEMICALS, INCORPORATED.), and 3.0 parts of a viscoelasticity imparting agent (SN thickener-651 manufactured by San Nopco Limited.) were added to form a slurry coating having each average particle diameter and major axis/minor axis ratio of the dispersed particle, and having each viscosity, as shown in Table 3.

Examples 25 to 32 and Comparative Examples 10 to 12

To 100 parts of each of the dispersions 1 to 11 obtained in Examples of Dispersion Preparation was added 100 parts of fine powder of the hydroxy-functional polyester resin (the polyester resin 2). The mixture was subjected to mixing at a velocity of 9,000 rpm for 1 minute by using an ultra-disperser (manufactured by YAMATO SCIENTIFIC CO., LTD.). Subsequently, 0.1 parts of a urethane forming catalyst (TEDA manufactured by Tosoh Corporation) and 0.1 parts of a light-resisting stabilizer (DIC-TBS manufactured by DAINIPPON INK AND CHEMICALS, INCORPORATED.) were added to form a slurry coating having each average particle diameter and major axis/minor axis ratio of the dispersed particle, and having each viscosity, as shown in Table 4.

Each slurry coating as formed by above each method was evaluated by the tests as described below. The results are shown in Tables 1, 2, 3, and 4.

Preparation of Test Piece

The resulting slurry coating was applied to a zinc phosphate-treated steel plate by spray coating and pre-baked at 60° C. for 10 minutes, and then baked and dried at 160° C. for 10 minutes, giving a film with a thickness of 0.03 mm.

Evaluation Tests

Measurement of Water Resistance

The resulting film was immersed in water at 80° C. for 120 hours, then cooled slowly at 20° C. for 3 hours. After wiping the surface of the film with a cloth, appearance of the film was visually evaluated as follows:

◯: The appearance of the film is substantially the same before and after the immersion.

x: The film shows wrinkling, cracking, blistering, or peeling or flaking.

Measurement of Solve-Out Rate

The film immersed in water at 25° C. for 1 hour was dried at 60° C. for 1 hour and weighed. The resulting weight was compared with the film weight before immersion, and the rate of decrease in the film weight was determined as the solve-out rate.

Measurement of Film Strength

The resulting film was measured for surface hardness with a Fischer hardness tester (FISCHERSCOPE® H100V manufactured by Fischer Instrumentation (GB) Ltd.) under the conditions of a load of 0.4 to 100 mN and an indentation depth of 5 μm. In this test, hardness of coating films can be converted into numbers with high precision, and several properties on film strength such as indentation hardness and Young's modulus can be evaluated at a time. Film strength can be evaluated by determining the surface hardness.

Evaluation of Dispersibility

The resulting slurry coating was centrifuged at 6,000 rpm for 15 minutes in a centrifugal separator, and then the precipitating condition of the dispersed resin was visually evaluated as follows:

○: The appearance of the dispersed material is substantially the same before and after the centrifugation.

Δ: The dispersed material is partially precipitated by the centrifugation.

x: The dispersed material is completely precipitated by the centrifugation.

Extract Content Ratio

After the heating and curing, 10 g of the resulting film was extracted with ethanol at 78° C. for 2 hours in a Soxhlet extractor. The resulting content of the extract was divided by the extract content of the film before the heating and curing to obtain the ratio value.

TABLE 1

|  | Surfactant | Average Particle Diameter ($\mu$m) | Major Axis/Minor Axis Ratio | Viscosity (mPa·s) | Extract Content Ratio | Dispersibility | Solve-Out Rate (%) | Water Resistance | Surface Hardness (N/mm$^2$) |
| --- | --- | --- | --- | --- | --- | --- | --- | --- | --- |
| Example 1 | B-1 | 4 | 1.0 | 3,400 | 2 | ○ | 0 | ○ | 153 |
| Example 2 | B-2 | 5 | 1.0 | 3,300 | 2 | ○ | 0 | ○ | 165 |
| Example 3 | B-3 | 6 | 1.0 | 3,100 | 2 | ○ | 0 | ○ | 152 |
| Example 4 | B-4 | 5 | 1.0 | 3,000 | 2 | ○ | 0 | ○ | 112 |
| Example 5 | B-5 | 5 | 1.0 | 3,200 | 2 | ○ | 0 | ○ | 110 |
| Example 6 | B-6 | 4 | 1.0 | 3,800 | 2 | ○ | 0 | ○ | 131 |
| Example 7 | B-7 | 7 | 1.0 | 3,600 | 2 | ○ | 0 | ○ | 122 |
| Example 8 | B-8 | 9 | 1.1 | 4,400 | 2 | ○ | 0 | ○ | 135 |
| Comparative Example 1 | B'-9 | 6 | 1.1 | 4,200 | 8 | ○ | 1 | X | 85 |
| Comparative Example 2 | B'-10 | 11 | 1.1 | 5,800 | 11 | X | 9 | X | 82 |
| Comparative Example 3 | B'-11 | 12 | 1.2 | 5,500 | 12 | X | 6 | X | 78 |

TABLE 2

|  | Surfactant | Average Particle Diameter ($\mu$m) | Major Axis/Minor Axis Ratio | Viscosity (mPa·s) | Extract Content Ratio | Dispersibility | Solve-Out Rate (%) | Water Resistance | Surface Hardness (N/mm$^2$) |
| --- | --- | --- | --- | --- | --- | --- | --- | --- | --- |
| Example 9 | B-1 | 7 | 1.2 | 4,200 | 2 | ○ | 0 | ○ | 93 |
| Example 10 | B-2 | 7 | 1.2 | 4,100 | 2 | ○ | 0 | ○ | 95 |
| Example 11 | B-3 | 7 | 1.2 | 4,000 | 2 | ○ | 0 | ○ | 92 |
| Example 12 | B-4 | 7 | 1.2 | 4,100 | 2 | ○ | 0 | ○ | 77 |
| Example 13 | B-5 | 7 | 1.2 | 4,100 | 2 | ○ | 0 | ○ | 81 |
| Example 14 | B-6 | 7 | 1.2 | 5,300 | 2 | ○ | 0 | ○ | 81 |
| Example 15 | B-7 | 7 | 1.2 | 4,300 | 2 | ○ | 0 | ○ | 83 |
| Example 16 | B-8 | 7 | 1.2 | 5,200 | 2 | ○ | 0 | ○ | 85 |
| Comparative Example 4 | B'-9 | 7 | 1.2 | 5,100 | 8 | ○ | 1 | X | 71 |
| Comparative Example 5 | B'-10 | 7 | 1.2 | 6,400 | 11 | X | 10 | X | 52 |
| Comparative Example 6 | B'-11 | 7 | 1.2 | 6,200 | 12 | X | 8 | X | 48 |

TABLE 3

|  | Surfactant | Average Particle Diameter ($\mu$m) | Major Axis/Minor Axis Ratio | Viscosity (mPa·s) | Extract Content Ratio | Dispersibility | Solve-Out Rate (%) | Water Resistance | Surface Hardness (N/mm$^2$) |
| --- | --- | --- | --- | --- | --- | --- | --- | --- | --- |
| Example 17 | B-1 | 4 | 1.0 | 3,400 | 2 | ○ | 0 | ○ | 147 |
| Example 18 | B-2 | 4 | 1.0 | 3,500 | 2 | ○ | 0 | ○ | 155 |
| Example 19 | B-3 | 5 | 1.0 | 3,200 | 2 | ○ | 0 | ○ | 152 |
| Example 20 | B-4 | 5 | 1.0 | 3,000 | 2 | ○ | 0 | ○ | 117 |
| Example 21 | B-5 | 5 | 1.0 | 3,500 | 2 | ○ | 0 | ○ | 121 |
| Example 22 | B-6 | 4 | 1.0 | 3,600 | 2 | ○ | 0 | ○ | 131 |
| Example 23 | B-7 | 6 | 1.0 | 3,700 | 2 | ○ | 0 | ○ | 128 |
| Example 24 | B-8 | 7 | 1.1 | 4,200 | 2 | ○ | 0 | ○ | 122 |
| Comparative Example 7 | B'-9 | 6 | 1.1 | 4,100 | 8 | ○ | 3 | X | 64 |

TABLE 3-continued

|  | Surfactant | Average Particle Diameter (μm) | Major Axis/Minor Axis Ratio | Viscosity (mPa·s) | Extract Content Ratio | Dispersibility | Solve-Out Rate (%) | Water Resistance | Surface Hardness (N/mm$^2$) |
|---|---|---|---|---|---|---|---|---|---|
| Comparative Example 8 | B'10 | 13 | 1.2 | 5,600 | 11 | X | 10 | X | 52 |
| Comparative Example 9 | B'-11 | 14 | 1.2 | 5,700 | 12 | X | 8 | X | 48 |

TABLE 4

|  | Surfactant | Average Particle Diameter (μm) | Major Axis/Minor Axis Ratio | Viscosity (mPa·s) | Extract Content Ratio | Dispersibility | Solve-Out Rate (%) | Water Resistance | Surface Hardness (N/mm$^2$) |
|---|---|---|---|---|---|---|---|---|---|
| Example 25 | B-1 | 7 | 1.2 | 4,400 | 2 | ○ | 0 | ○ | 97 |
| Example 26 | B-2 | 7 | 1.2 | 4,400 | 2 | ○ | 0 | ○ | 98 |
| Example 27 | B-3 | 7 | 1.2 | 4,300 | 2 | ○ | 0 | ○ | 91 |
| Example 28 | B-4 | 7 | 1.2 | 4,100 | 2 | ○ | 0 | ○ | 83 |
| Example 29 | B-5 | 7 | 1.2 | 4,300 | 2 | ○ | 0 | ○ | 86 |
| Example 30 | B-6 | 7 | 1.2 | 5,500 | 2 | ○ | 0 | ○ | 77 |
| Example 31 | B-7 | 7 | 1.2 | 4,600 | 2 | ○ | 0 | ○ | 84 |
| Example 32 | B-8 | 7 | 1.2 | 5,500 | 2 | ○ | 0 | ○ | 81 |
| Comparative Example 10 | B'-9 | 7 | 1.2 | 5,400 | 8 | ○ | 1 | X | 83 |
| Comparative Example 11 | B'-10 | 7 | 1.2 | 6,500 | 12 | X | 12 | X | 42 |
| Comparative Example 12 | B'-11 | 7 | 1.2 | 6,400 | 12 | X | 9 | X | 35 |

Synthesis Example 9

To a reaction vessel equipped with a stirrer, a dropping funnel, a nitrogen gas introducing tube, a thermometer, and a reflux condenser were added 49 parts of 4-α-cumylphenol and 6.5 parts of a Lewis acid catalyst (GalleonEarth, manufactured by MIZUSAWA INDUSTRIAL CHEMICALS, LTD.). With stirring, the space of the system was replaced with nitrogen gas, and the materials were heated to 90° C. At the same temperature, 168 parts of an ethanol-blocked product of 3-isopropenyl-α,α-dimethylbenzyl isocyanate was added dropwise over a time period of 3 hours and allowed to react at the same temperature for 5 hours. The reaction mixture was cooled to 30° C., and then the catalyst was separated by filtration so that 142 parts of an adduct of 3 moles of the ethanol-blocked product of 3-isopropenyl-α, α-dimethylbenzyl isocyanate and 1 mole of the 4-α-cumylphenol (2,000 in number average molecular weight) was produced. At 80° C., 189 parts of an adduct of EO and the product (25% in EO content), 782 parts of polyethylene glycol (9,000 in number average molecular weight), and 29 parts of hexamethylene diisocyanate were allowed to react for 3 hours, giving 100 parts of a reactive surfactant (B-9) with a weight average molecular weight of 23,000.

Examples of Dispersion Preparation

Into 100 parts of water was dispersed 3 parts of the reactive surfactant (B-9) or a surfactant (Orotan 731A manufactured by Rohm and Haas Company) to form a dispersion. The resulting products were named "dispersion 12" and "dispersion 13" respectively.

Example 33

In a beaker were mixed 52 parts of the acrylic resin 1, 45 parts of an MEK oxime-blocked HDI isocyanurate (DURANATE manufactured by Asahi Kasei Corporation), 3 parts of 1,8-diazabicyclo[5,4,0]-undecene-7, and 100 parts of tetrahydrofuran. The resulting mixture was added to 100 parts of the dispersion 12 and then subjected to mixing at a velocity of 9,000 rpm for 1 minute by using a Laboratory Mixer (T. K. Robomix manufactured by TOKUSHU KIKA KOGYO CO., LTD.) to have an average particle diameter of 5 μm. After the mixing, the mixture was poured into a four-neck flask equipped with a stirring rod and a thermometer and then subjected to desolvation under reduced pressure at 25° C. for 10 hours. Subsequently, 0.1 parts of a light-resisting stabilizer (DIC-TBS manufactured by DAINIPPON INK AND CHEMICALS, INCORPORATED.) and 3.0 parts of a viscoelasticity imparting agent (SN thickener-651 manufactured by San Nopco Limited.) were added to form a desired water-dispersed powder slurry coating having a dispersed particle diameter of 5 μm, a major axis/minor axis ratio of 1.0, and a viscosity of 2,000 mPa·s.

Examples 34 to 36 and Comparative Examples 13 to 15

Water-dispersed powder slurry coatings were prepared using the process of Example 33, except that different dispersions and catalysts were used as shown in Table 5. General tertiary amine catalysts (diazabicyclooctane and diethylethanolamine) were used to form water-dispersed powder slurry coatings (Comparative Examples 13 and 14). A water-dispersed powder slurry coating was also prepared with no catalyst (Comparative Example 15).

Each of the resulting water-dispersed powder slurry coatings was evaluated by the tests as described below. The results are shown in Table 5.

Preparation of Test Piece

The test piece was prepared as described above.

Evaluation Tests

Measurement of Gel Fraction

About 10 g of the resulting film was immersed in 100 g of acetone at 20° C. for 24 hours and then removed and dried at 60° C. for 5 hours. The film weight after the drying was divided by the film weight before the immersion and then multiplied by 100, resulting in a gel fraction value.

Measurement of Film Strength

The film strength was measured as described above.

TABLE 5

| | | | Curing Temperature | | | |
| | | | 140° C. | | 160° C. | |
| | Dispersion | Curing Catalyst | Gel Fraction (weight %) | Surface Hardness (N/mm$^2$) | Gel Fraction (weight %) | Surface Hardness (N/mm$^2$) |
| --- | --- | --- | --- | --- | --- | --- |
| Example 33 | Dispersion 12 | 1,8-diazabicyclo[5,4,0]-undecen-7 | 94 | 125 | 98 | 129 |
| Example 34 | Dispersion 13 | 1,8-diazabicyclo[5,4,0]-undecen-7 | 93 | 115 | 95 | 118 |
| Example 35 | Dispersion 12 | 1,5-diazabicyclo[4,3,0]-nonene-5 | 93 | 131 | 96 | 134 |
| Example 36 | Dispersion 12 | 1-ethylimidazole | 93 | 114 | 95 | 118 |
| Comparative Example 13 | Dispersion 12 | Diazabicyclooctane | 80 | 85 | 91 | 108 |
| Comparative Example 14 | Dispersion 13 | Diethylethanolamine | 75 | 77 | 90 | 101 |
| Comparative Example 15 | Dispersion 13 | — | 47 | 52 | 50 | 61 |

As shown in the above examples, the low temperature-cured type water-dispersed powder slurry coating of the present invention can provide a film that has a desired gel fraction and a desired surface hardness after the baking at a temperature of 140° C. In contrast, the water-dispersed powder slurry coatings of Comparative Examples cannot provide the film with a desired gel fraction or a desired surface hardness after the baking at 140° C. and apparently need a high baking temperature of 160° C. to provide a gel fraction and a surface hardness at substantially the same level of that of the present invention.

The water-dispersed powder slurry coating of the present invention can provide excellent film strength and excellent cured film properties such as water resistance, because of the presence of at least one member selected from the group consisting of the isocyanate group, the blocked isocyanate group, and the epoxy group in the material molecule and because of the dispersed resin having the active hydrogen. The coating of the present invention can show excellent dispersion stability during the storage and provide a cured film that provides an extract content ratio of 10% or less and shows excellent resistance to acid rain.

The low temperature-cured type water-dispersed powder slurry coating of the present invention can be baked at a lower temperature than the conventional coating, and therefore the time period of heating and cooling can be reduced and the productivity can be improved. The heat source for such a lower temperature is preferred in terms of environment.

For example, the water-dispersed powder slurry coating of the present invention will be very useful as a coating for automobiles, architectural structures, and industrial machines, because of the advantageous effects as described above.

What is claimed is:

1. A water-dispersed powder slurry coating, comprising:
(A) a particulate comprising (a1) a resin having an active hydrogen;
(B) a reactive surfactant having at least one of an optionally blocked isocyanate group and an epoxy group;
(M) an aqueous medium in which said particulate and said reactive surfactant are contained; (a2) a curing agent; and
(C) at least one catalyst selected from the group consisting of (c1) a cyclic amidine, (c2) a cyclic tertiary amidine salt, and (c3) a cyclic quaternary amidinium salt, wherein said curing agent (a2) has a blocked isocyanate group.

2. The water-dispersed powder slurry coating according to claim 1, further comprising (B') a nonreactive surfactant.

3. The water-dispersed powder slurry coating according to claim 1, wherein said catalyst (C) comprises at least one of the cyclic amidines (c1) represented by the general formula (2):

wherein

T$^1$ and T$^2$ are the same or different and each represents a hydrogen atom or a monovalent hydrocarbon group having 1 to 20 carbon atoms optionally substituted with a hydroxyl group, wherein T$^1$ may form a ring together with T$^2$, C and N, D represents a divalent hydrocarbon group having 2 to 10 carbon atoms optionally substituted with an amino group, a nitro group, a cyano group, a carboxyl group, an aldehyde group, or a monovalent hydrocarbon group having 1 to 5 carbon atoms, and tertiary or quaternary salts thereof.

4. The water-dispersed powder slurry coating according to claim 3, wherein said catalyst (C) is at least one of the cyclic amidines (c1) having an imidazole ring, a 2-imidazoline ring, or a tetrahydropyrimidine ring.

5. The water-dispersed powder slurry coating according to claim 1, wherein said reactive surfactant (B) has a hydrophilic moiety of at least one member selected from the group consisting of an oxyethylene unit, an anion group, a cation group, and an amphoteric ion group.

6. The water-dispersed powder slurry coating according to claim 5, wherein said reactive surfactant (B) comprises (L) a urethane resin having at least one of an optionally blocked isocyanate group and an epoxy group and comprising:

(b3) an addition reaction product of (b1) a monohydric phenol or a monohydric aromatic alcohol and at least one of (b2) a vinyl monomer having an optionally blocked isocyanate group and (b2') a vinyl monomer having an epoxy group, or an alkylene oxide adduct of the addition reaction product;

(b4) an organic diisocyanate; and (b5) at least one of a diol and a diamine each having a polyoxyalkylene chain including a polyoxyethylene moiety.

7. The water-dispersed powder slurry coating according to claim 6, wherein said reactive surfactant (B) comprises at least one of the compounds represented by the general formula (1):

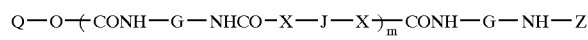
(1)

wherein

Q represents a residue of (b3) an addition reaction product of (b1) a monohydric phenol or a monohydric aromatic alcohol and at least one of (b2) a vinyl monomer having an optionally blocked isocyanate group and (b2') a vinyl monomer having an epoxy group, or an alkylene oxide adduct of the addition reaction product, G represents a residue of (b4) an organic diisocyanate optionally having a urea bond, X represents O or NH, J represents a residue of (b5) at least one of a diol and a diamine each having a polyoxyalkylene chain that includes a polyoxyethylene moiety, Z represents hydrogen or the group represented by —COO—Q or —CO—Y, wherein Y is —OR$^1$, wherein R$^1$ is a monohydric alcohol residue having 1 to 18 carbon atoms, or —NR$^2$R$^3$, wherein R$^2$ is a hydrocarbon group having 1 to 18 carbon atoms or a hydroxyalkyl group having 1 to 16 carbon atoms, and R$^3$ is hydrogen, a hydrocarbon group having 1 to 18 carbon atoms, or a hydroxyalkyl group having 1 to 16 carbon atoms, and m is an integer of 1 to 500.

8. The water-dispersed powder slurry coating according to claim 6, wherein said vinyl monomer (b2) is 3-isopropenyl-α, α-dimethylbenzylisocyanate having the isocyanate group optionally blocked or 3-ethylenyl-α, α-dimethylbenzylisocyanate having the isocyanate group optionally blocked.

9. The water-dispersed powder slurry coating according to claim 5, wherein said reactive surfactant (B) contains 20% by weight to 90% by weight of an oxyethylene unit based on the weight of said surfactant (B) as a hydrophilic moiety.

10. The water-dispersed powder slurry coating according to claim 5, wherein said reactive surfactant (B) comprises:

(b3') a residue of an addition reaction product of (b1) a monohydric phenol or a monohydric aromatic alcohol and at least one of (b2) a vinyl monomer having an optionally blocked isocyanate group and (b2') a vinyl monomer having an epoxy group, or a residue of an alkylene oxide adduct of the addition reaction product; and at least one ion group selected from the group consisting of an anion group, a cation group, and an amphoteric ion group.

11. The water-dispersed powder slurry coating according to claim 5, wherein said reactive surfactant (B) contains 0.1% by weight to 50% by weight of at least one ion group selected from the group consisting of an anion group, a cation group, and an amphoteric ion group based on the weight of said surfactant (B) as a hydrophilic moiety.

12. The water-dispersed powder slurry coating according to claim 1, wherein said resin (a1) is at least one member selected from the group consisting of an acrylic resin, a polyester resin, a polyurethane resin, and an epoxy resin.

13. The water-dispersed powder slurry coating according to claim 1, further comprising (d1) a reactive viscoelasticity adjusting agent.

14. The water-dispersed powder slurry coating according to claim 1, wherein said particulate (A) has an average particle diameter of from 0.1 μm to 50 μm.

15. The water-dispersed powder slurry coating according to claim 1, wherein said particulate (A) has a spherical shape with a major axis/minor axis ratio of 1.0 to 1.5.

16. The water-dispersed powder slurry coating according to claim 1, wherein said particulate (A) is formed by dispersing a solvent solution of said resin (a1) into water and removing said solvent.

17. A film formed by applying the water-dispersed powder slurry coating according to claim 1 and baking it.

18. The film according to claim 17, wherein said film cured provides an extract content ratio of 10% or less, wherein said ratio is a ratio of the extract content obtained by extraction of said film with ethanol at 78° C. for two hours to the extract content obtained by extraction of a film before curing which is formed by applying the water-dispersed powder slurry coating with ethanol at 78° C. for two hours.

* * * * *